United States Patent

Spilker, Jr.

(10) Patent No.: US 6,963,306 B2
(45) Date of Patent: Nov. 8, 2005

(54) POSITION LOCATION AND DATA TRANSMISSION USING PSEUDO DIGITAL TELEVISION TRANSMITTERS

(75) Inventor: James J. Spilker, Jr., Woodside, CA (US)

(73) Assignee: Rosum Corp., Redwood City, CA (US)

( * ) Notice: Subject to any disclaimer, the term of this patent is extended or adjusted under 35 U.S.C. 154(b) by 0 days.

(21) Appl. No.: 10/787,058

(22) Filed: Feb. 24, 2004

(65) Prior Publication Data

US 2005/0030229 A1 Feb. 10, 2005

Related U.S. Application Data

(63) Continuation-in-part of application No. 10/210,847, filed on Jul. 31, 2002, which is a continuation of application No. 09/887,158, filed on Jun. 21, 2001, now abandoned.

(60) Provisional application No. 60/453,461, filed on Mar. 10, 2003, provisional application No. 60/449,688, filed on Feb. 24, 2003, provisional application No. 60/344,988, filed on Dec. 20, 2001, provisional application No. 60/309,267, filed on Jul. 31, 2001, provisional application No. 60/293,813, filed on May 25, 2001, provisional application No. 60/293,812, filed on May 25, 2001, provisional application No. 60/293,646, filed on May 25, 2001, provisional application No. 60/281,270, filed on Apr. 3, 2001, provisional application No. 60/281,269, filed on Apr. 3, 2001, and provisional application No. 60/265,675, filed on Feb. 2, 2001.

(51) Int. Cl.$^7$ ................................. G01S 3/02
(52) U.S. Cl. .................. 342/464; 342/357.09; 375/130; 375/149
(58) Field of Search ............... 342/464, 357.01, 342/357.06, 357.09; 375/130, 133, 141, 145, 146, 149

(56) References Cited

U.S. PATENT DOCUMENTS

| 4,555,707 A | 11/1985 | Connelly |
| 4,652,884 A | 3/1987 | Starker |
| 4,894,662 A | 1/1990 | Counselman |
| 5,045,861 A | 9/1991 | Duffett-Smith |

(Continued)

FOREIGN PATENT DOCUMENTS

| GB | 2 222 922 A | 3/1990 |
| GB | 2 254 508 A | 10/1992 |

OTHER PUBLICATIONS

U.S. Appl. No. 10/036,700, filed Dec. 31, 2001, Panasik et al.

Parkinson, B.W., et al., "Autonomous GPS Integrity Monitoring Using the Pseudorange Residual," *Journal of the Institute of Navigation* (1988), vol. 35, No. 2, pp. 255–274.

(Continued)

*Primary Examiner*—Dao Phan
(74) *Attorney, Agent, or Firm*—Richard A. Dunning, Jr.

(57) ABSTRACT

A method, apparatus, and computer-readable media comprising generating a positioning signal comprising a first half-field and a second half-field; and transmitting the positioning signal; wherein each of the first and second half-fields comprises 313 segments; and wherein each of the segments comprises 832 chips comprising an American Television Standards Committee (ATSC) digital television (DTV) segment synchronization signal and a pseudonoise sequence.

24 Claims, 22 Drawing Sheets

U.S. PATENT DOCUMENTS

| | | | |
|---|---|---|---|
| 5,157,686 A | 10/1992 | Omura et al. | |
| 5,166,952 A | 11/1992 | Omura et al. | |
| 5,323,322 A | 6/1994 | Mueller et al. | |
| 5,398,034 A | 3/1995 | Spilker, Jr. | |
| 5,481,316 A | 1/1996 | Patel | |
| 5,504,492 A | 4/1996 | Class et al. | |
| 5,510,801 A | 4/1996 | Engelbrecht et al. | |
| 5,604,765 A | 2/1997 | Bruno et al. | |
| 5,648,982 A * | 7/1997 | Durrant et al. | 375/146 |
| 5,774,829 A | 6/1998 | Cisneros et al. | |
| 5,920,284 A | 7/1999 | Victor | |
| 5,952,958 A | 9/1999 | Speasl et al. | |
| 6,016,119 A | 1/2000 | Krasner | |
| 6,078,284 A | 6/2000 | Levanon | |
| 6,094,168 A | 7/2000 | Duffett-Smith et al. | |
| 6,107,959 A | 8/2000 | Levanon | |
| 6,137,441 A | 10/2000 | Dai et al. | |
| 6,215,778 B1 * | 4/2001 | Lomp et al. | 370/335 |
| 6,317,452 B1 * | 11/2001 | Durrant et al. | 375/130 |
| 6,317,500 B1 | 11/2001 | Murphy | |
| 6,373,432 B1 | 4/2002 | Rabinowitz et al. | |
| 6,374,177 B1 | 4/2002 | Lee et al. | |
| 6,433,740 B1 | 8/2002 | Gilhousen | |
| 6,590,529 B2 | 7/2003 | Schwoegler | |

OTHER PUBLICATIONS

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59–73.

Spilker, Jr., J.J., "Fundamentals of Signal Tracking Theory," *Global Positioning System: Theory and Applications* (1994), vol. 1, Chapter 7, pp. 245–327.

Van Dierendock, A.J., "GPS Receivers," *Global Positioning System: Theory and Applications* (1995), vol. 1, Chapter 8, pp. 329–407.

Li, X., et al., "Indoor Geolocation Using OFDM Signals in HIPERLAN/2 Wireless LANS," 11$^{th}$ IEEE International Symposium on Personal Indoor and Mobile Radio Communications, PIMRC 2000, Proceedings (Cat. No. 00TH8525), Proceedings of 11$^{th}$ International Symposium on Personal Indoor and Mobile Radio Communication, London, UK, Sep. 18–21, pp. 1449–1453, vol. 2, XPO10520871, 2000, Piscataway, NJ, USA, IEEE, USA, ISBN; 9–7803–6463–5, Chapter I and III.

Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

EP Abstract/Zusammenfassung/Abrege, 02102666.1.

JP Abstract/vol. 007, No. 241 (P–232), Oct. 26, 1983 & JP58 129277 A (Nihon Musen KK) Aug. 2, 1983.

* cited by examiner

900 →

| 4 | 511 Symbols | 63 | 63 | 63 | 128 |

| 4 | 828 Symbols |

FIG. 10

POSITION LOCATION AND DATA TRANSMISSION USING PSEUDO DIGITAL TELEVISION TRANSMITTERS

CROSS-REFERENCE TO RELATED APPLICATIONS

This application claims the benefit of U.S. Non-provisional Patent Application Ser. No. 60/449,688, "Proposed Pseudo TV Transmitter System for TV Location Augmentation and Data Transmission," by James J. Spilker Jr., filed Feb. 24, 2003. This application claims the benefit of U.S. Non-provisional Patent Application Ser. No. 60/453,461, "Emergency Position Location Using DTV Technology." by James J. Spilker Jr., filed Mar. 10, 2003. This application is a continuation-in-part of U.S. Non-provisional Patent Application Ser. No. 10/210,847, "Position Location Using Broadcast Digital Television Signals," by Matthew Rabinowitz and James J. Spilker, filed Jul. 31, 2002, which is a continuation of U.S. Non-provisional Patent Application Ser. No. 09/887,158, "Position Location using Broadcast Digital Television Signals," by Matthew Rabinowitz and James J. Spilker, filed Jun. 21, 2001 now abandoned, which claims the benefit of U.S. Provisional Patent Applications Ser. No. 60/265,675, "System and Method for Navigation and/or Data Communication Using Satellite and/or Terrestrial Infrastructure," by Matthew Rabinowitz and James J. Spilker, filed Feb. 2, 2001; Ser. No. 60/281,270, "Use of the ETSI DVB Terrestrial Digital TV Broadcast Signals For High Accuracy Position Location in Mobile Radio Links," by James J. Spilker, filed Apr. 3, 2001; Ser. No. 60/281,269, "An ATSC Standard DTV Channel For Low Data Rate Broadcast to Mobile Receivers," by James J. Spilker and Matthew Rabinowitz, filed Apr. 3, 2001; Ser. No. 60/293,812, "DTV Monitor System Unit (MSU)," by James J. Spilker and Matthew Rabinowitz, filed May 25, 2001; Ser. No. 60/293,813, "DTV Position Location Range And SNR Performance," by James J. Spilker and Matthew Rabinowitz, filed May 25, 2001; Ser. No. 60/293,646, "Time-Gated Noncoherent Delay Lock Loop Tracking Of DTV Signals," by James J. Spilker and Matthew Rabinowitz, filed May 25, 2001; Ser. No. 60/309,267, "Methodology and System for Tracking the Digital Television Signal with Application to Positioning Wireless Devices," by James Omura, James J. Spilker Jr., and Matthew Rabinowitz, filed Jul. 31, 2001; and Ser. No. 60/344,988, "Advanced Position Location Technique using Television Transmissions from Synchronized Transmitters," by James J. Spilker Jr., filed Dec. 20, 2001. The subject matter of all of the foregoing are incorporated herein by reference.

BACKGROUND

The present invention relates generally to data transmission, and particularly to position location and data transmission using pseudo digital television transmitters.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (with an ERP of approximately 1000 watts) and over great distances, the received signal strength is relatively weak (on the order of −160 dBw as received by an omni-directional antenna). Thus the signal is marginally useful or not useful at all in the presence of blockage or inside a building. The GPS satellite constellation has been augmented by "pseudo-lites," which are ground-based transmitters of GPS signals. However, the same problems of signal level and coverage apply to GPS pseudo-lites.

There has even been a proposed system using conventional analog National Television System Committee (NTSC) television signals to determine position. This proposal is found in a U.S. patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry. Further, in 2006 the Federal Communication Commission (FCC) will consider turning off NTSC transmitters and reassigning that valuable spectrum so that it can be auctioned for other purposes deemed more valuable.

SUMMARY

Advantages that can be seen in implementations of the invention include one or more of the following.

The signals disclosed herein have several advantages for acquisition and tracking over the conventional ATSC DTV signal. Initial acquisition can be performed with a search over 832 symbols as in the symbol synchronization search. A matched filter can be used with the full 832-symbol length instead of simply looking for the 4-symbol segment sync code, producing a much higher initial synchronization processing gain. Furthermore, this acquisition takes only 77 microseconds and is very tolerant of Doppler offset.

The second search is over the 313 segments that make up the c313 code described below, and can also be performed with a matched filter processing the matched filter peaks from the 832-chip code. Thus the acquisition time is greatly reduced over that of a single long 313×832 chip code and performs quite well. The acquisition of the 313-chip code then allows the half field synchronization, providing the full processing gain, and recovery of any data stream in the signal.

Implementations of the invention can be used to position cellular telephones, wireless PDA's (personal digital assistant), pagers, cars, OCDMA (orthogonal code-division multiple access) transmitters and a host of other devices. Implementations of the invention make use of a positioning signal that is similar to a DTV signal which has excellent coverage over the United States, and the existence of which is mandated by the Federal Communication Commission. Implementations of the present invention employ the positioning signal alone or in combination with one or more DTV signals.

The DTV signal has a power advantage over GPS of more than 40 dB, and substantially superior geometry to that which a satellite system could provide, thereby permitting position location even in the presence of blockage and indoors. The DTV signal has roughly six times the bandwidth of GPS, thereby minimizing the effects of multipath. Due to the high power and low duty factor of the DTV signal used for ranging, the processing requirements are minimal. Implementations of the present invention accommodate far cheaper, lower-speed, and lower-power devices than a GPS technique would require.

In contrast to satellite systems such as GPS, the range between the DTV transmitters and the user terminals changes very slowly. Therefore the DTV signal is not significantly affected by Doppler effects. This permits the signal to be integrated for a long period of time, resulting in very efficient signal acquisition.

The frequency of the DTV signal is substantially lower that that of conventional cellular telephone systems, and so has better propagation characteristics. For example, the DTV signal experiences greater diffraction than cellular signals, and so is less affected by hills and has a larger horizon. Also, the signal has better propagations characteristics through buildings and automobiles.

Unlike the terrestrial Angle-of-Arrival/Time-of-Arrival positioning systems for cellular telephones, implementations of the present invention require no change to the hardware of the cellular base station, and can achieve positioning accuracies on the order of 1 meter. When used to position cellular phones, the technique is independent of the air interface, whether GSM (global system mobile), AMPS (advanced mobile phone service), TDMA (time-division multiple access), CDMA, or the like. A wide range of UHF (ultra-high frequency) frequencies has been allocated to DTV transmitters. Consequently, there is redundancy built into the system that protects against deep fades on particular frequencies due to absorption, multipath and other attenuating effects.

In general, in one aspect, the invention features a method, apparatus, and computer-readable media comprising generating a positioning signal comprising a first half-field and a second half-field; and transmitting the positioning signal; wherein each of the first and second half-fields comprises 313 segments; and wherein each of the segments comprises 832 chips comprising an American Television Standards Committee (ATSC) digital television (DTV) segment synchronization signal and a pseudonoise sequence.

Particular implementations can include one or more of the following features. The pseudonoise sequence comprises a portion of at least one of the group consisting of a rotated version of the ATSC DTV field synchronization signal; and a Global Positioning System L5 code. A user terminal receives the positioning signal and determines the location of the user terminal based on the positioning signal. The segments are generated at a segment rate, and the implementations comprise modulating at least one of the group consisting of the first half-fields and the second half-fields of the positioning signal using a further pseudonoise sequence having a chip rate corresponding to the segment rate. The further pseudonoise sequence comprises a portion of at least one of the group consisting of a rotated version of the 511-chip field synchronization signal; and a Global Positioning System L5 code. The half-fields are generated at a half-field rate, and implementations comprise modulating at least one of the group consisting of the first half-fields and the second half-fields of the positioning signal using a binary data stream having a bit rate corresponding to the half-field rate. The binary data stream represents at least one of the group consisting of a time of day; a date; and a year.

In general, in one aspect, the invention features a method, apparatus, and computer-readable media for determining the position of a user terminal, comprising receiving, at the user terminal, a positioning signal comprising a first half-field and a second half-field; wherein each of the first and second half-fields comprises 313 segments; wherein each of the segments comprises 832 chips comprising an American Television Standards Committee (ATSC) digital television (DTV) segment synchronization signal and a pseudonoise sequence; and generating a pseudorange based on the positioning signal; wherein the location of the user terminal is determined based on the pseudorange and a location of the transmitter of the positioning signal.

Particular implementations can include one or more of the following features. The pseudonoise sequence comprises a portion of at least one of the group consisting of a rotated version of the ATSC DTV field synchronization signal; and a Global Positioning System L5 code. Implementations comprise receiving a further signal selected from the group consisting of a digital television signal, a global positioning signal, and a mobile telephone signal; generating a further pseudorange based on the further signal; wherein the location of the user terminal is determined based on the pseudorange, the location of the transmitter of the positioning signal, the further pseudorange, and a location of the transmitter of the further signal. Implementations comprise determining the location of the user terminal based on the pseudorange and the location of the transmitter of the positioning signal. Implementations comprise determining the location of the user terminal based on the pseudo-range, the location of the transmitter of the positioning signal, and a difference between a transmitter clock at the transmitter of the positioning signal and a known time reference. Implementations comprise tracking the positioning signal with a time-gated delay-lock loop. Implementations comprise storing a portion of the positioning signal; and correlating the stored portion of the positioning signal and a signal generated by the user terminal. Determining a pseudo-range comprises correlating the positioning signal with a signal generated by the user terminal as the positioning signal is received. Implementations comprise determining a general geographic area within which the user terminal is located; and determining the position of the user terminal based on the pseudo-range and the general geographic area. Implementations comprise determining a terrain elevation in a vicinity of the user terminal; and determining the position of the user terminal based on the pseudo-range and the terrain elevation. The segments occur at a segment rate, and wherein the positioning signal further comprises a further pseudonoise sequence having a chip rate corresponding to the segment rate, and implementations comprise identifying a transmitter of the positioning signal based on the further pseudonoise sequence. The half-fields occur at a half-field rate, and wherein the positioning signal further comprises a binary data stream having a bit rate corresponding to the half-field rate, and implementations comprise recovering the binary data stream.

The details of one or more implementations are set forth in the accompanying drawings and the description below. Other features will be apparent from the description and drawings, and from the claims.

DESCRIPTION OF DRAWINGS

FIG. 9 illustrates the structure of the field synchronization segment of the ATSC frame.

FIG. 10 illustrates the structure of the data segment of the ATSC frame.

Figure 1:
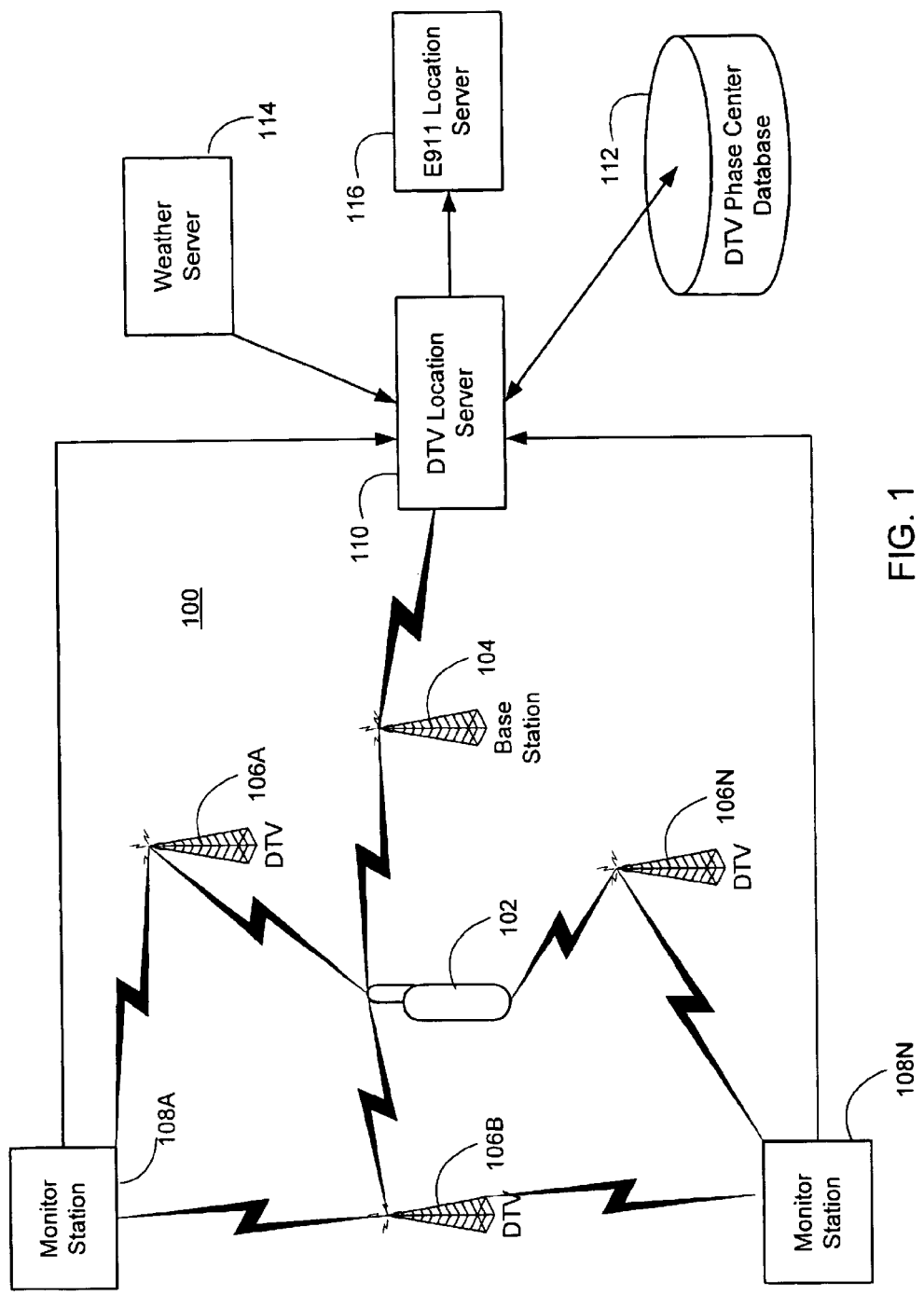
FIG. 1 depicts an implementation of the present invention including a user terminal that communicates over an air link with a base station.

The leading digit(s) of each reference numeral used in this specification indicates the number of the drawing in which the reference numeral first appears.

DETAILED DESCRIPTION

Introduction

Digital television (DTV) is growing in popularity. DTV was first implemented in the United States in 1998. As of the end of 2000, 167 stations were on the air broadcasting the DTV signal. As of Feb. 28 2001, approximately 1200 DTV construction permits had been acted on by the FCC. According to the FCC's objective, all television transmission will soon be digital, and analog signals will be eliminated. Over 1600 DTV transmitters are expected in the United States.

These new DTV signals permit multiple standard definition TV signals or even high definition signals to be transmitted in the assigned 6 MHz channel. These new American Television Standards Committee (ATSC) DTV signals are completely different from the analog NTSC TV signals, are transmitted on new 6 MHz frequency channels, and have completely new capabilities.

The inventors have recognized that the ATSC signal can be used for position location, and have developed techniques for doing so. These techniques are usable in the vicinity of ATSC DTV transmitters with a range from the transmitter much wider than the typical DTV reception range. Because of the high power of the DTV signals, these techniques can even be used indoors by handheld receivers, and thus provide a possible solution to the position location needs of the Enhanced 911 (E911) system.

The techniques disclosed herein are also applicable to DTV signals as defined by the Digital Video Broadcasting (DVB) standard recently adopted by the European Telecommunications Standards Institute (ETSI). For example, the techniques described herein can be used with the scattered pilot carrier signals embedded within the DVB signal. The DVB scattered pilot carrier signals are a set of 868 uniformly-spaced pilot carrier signals, each of which is frequency hopped in a chirp-like fashion over four sequentially-increasing frequencies. These techniques are also applicable to DTV signals as defined by the Japanese Integrated Service Digital Broadcasting-Terrestrial (ISDB-T). These techniques are also applicable to other DTV signals, including those which transmit a known sequence of data.

In contrast to the digital pseudo-noise codes of GPS, the DTV signals are received from transmitters only a few miles distant, and the transmitters broadcast signals at levels up to the megawatt level. In addition the DTV antennas have significant antenna gain, on the order of 14 dB. Thus there is often sufficient power to permit DTV signal reception inside buildings.

Certain implementations of the present invention use only the DTV signal synchronization codes as opposed to demodulating and decoding the DTV 8-ary Vestigial Sideband Modulation (8VSB) data signal. Consequently, the DTV signal can be correlated for a period roughly a million times longer than the period of single data symbol. Thus the ability to track signals indoors at substantial range from the DTV tower is greatly expanded. Furthermore, through the use of digital signal processing it is possible to implement these new tracking techniques in a single semiconductor chip.

DTV signals carry high rate information in the range of 19 Msps in the form of MPEG-2 packets. These packets can carry one or more digital television signals including High Definition TV video. In addition, many of the packets are unused or null packets, and can be used to carry digital data to a variety of users including mobile users. Indeed, digital television might in the future be primarily used by mobile rather than fixed users.

The multiplicity of very high power digital TV signals each of high bandwidth dominates the communication capacity of other wireless access methods such as cellular, and has a much wider coverage area than wireless LAN. Many gigabytes of data can be delivered each minute.

The combination of these technologies then can provide a wide variety of data that is directed towards users in particular geographic areas. For example, a mobile computing platform which has knowledge of its location can filter or screen incoming data for relevance to that location. Such data can include descriptions of traffic jams or roadway accidents, emergency information about a fire or impending disaster, weather information, specific maps with hotels, restaurants, etc., and the like.

A feature of this system is the availability of the very high power, typically megawatt transmitted power of these wide bandwidth (at least 6 MHz) TV channels. High speed digital TV standards have now been established around the world with standards for North America, Europe, Japan. Billions of dollars are being invested in these new broadcast technologies. There are and will continue to be more TV sets than telephones. Thus this technology is applicable with minor variations over much of the world, and the coverage areas are now rapidly expanding.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the DTV position location described. Examples of user terminals include PDAs, mobile phones, cars and other vehicles, and any object which could include a chip or software implementing DTV position location. It is not intended to be limited to objects which are "terminals" or which are operated by "users."

Position Location Performed by a DTV Location Server

Figure 2:
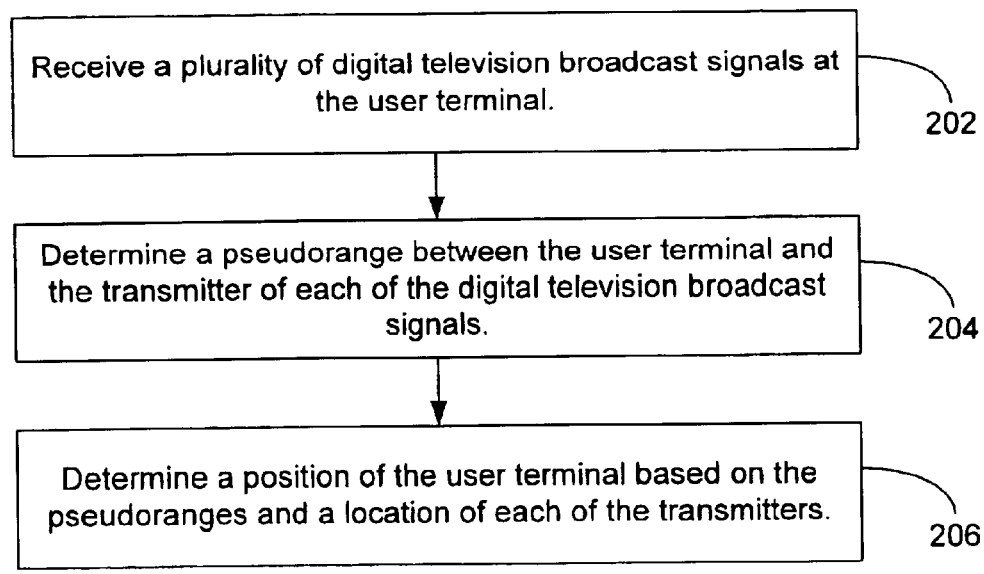
FIG. 2 illustrates an operation of an implementation of the invention.

FIG. 2 illustrates an operation of implementation 100. User terminal 102 receives DTV signals from a plurality of DTV transmitters 106A and 106B through 106N (step 202).

Various methods can be used to select which DTV channels to use in position location. In one implementation, a DTV location server 110 tells user terminal 102 of the best DTV channels to monitor. In one implementation, user terminal 102 exchanges messages with DTV location server 110 by way of base station 104. In one implementation user terminal 102 selects DTV channels to monitor based on the identity of base station 104 and a stored table correlating base stations and DTV channels. In another implementation, user terminal 102 can accept a location input from the user that gives a general indication of the area, such as the name of the nearest city; and uses this information to select DTV channels for processing. In one implementation, user terminal 102 scans available DTV channels to assemble a fingerprint of the location based on power levels of the available DTV channels. User terminal 102 compares this fingerprint to a stored table that matches known fingerprints with known locations to select DTV channels for processing.

User terminal 102 determines a pseudo-range between the user terminal 102 and each DTV transmitter 106 (step 204). Each pseudo-range represents the time difference (or equivalent distance) between a time of transmission from a transmitter 108 of a component of the DTV broadcast signal and a time of reception at the user terminal 102 of the component, as well as a clock offset at the user terminal.

User terminal 102 transmits the pseudo-ranges to DTV location server 110. In one implementation, DTV location server 110 is implemented as a general-purpose computer executing software designed to perform the operations described herein. In another implementation, DTV location server is implemented as an ASIC (application-specific integrated circuit). In one implementation, DTV location server 110 is implemented within or near base station 104.

The DTV signals are also received by a plurality of monitor units 108A through 108N. Each monitor unit can be implemented as a small unit including a transceiver and processor, and can be mounted in a convenient location such as a utility pole, DTV transmitters 106, or base stations 104. In one implementation, monitor units are implemented on satellites.

Each monitor unit 108 measures, for each of the DTV transmitters 106 from which it receives DTV signals, a time offset between the local clock of that DTV transmitter and a reference clock. In one implementation the reference clock is derived from GPS signals. The use of a reference clock permits the determination of the time offset for each DTV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives DTV signals from all of the same DTV transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset}=a+b(t-T)+c(t-T)^2 \tag{1}$$

that can be described by a, b, c, and T. In either implementation, each measured time offset is transmitted periodically to the DTV location server using the Internet, a secured modem connection or the like. In one implementation, the location of each monitor unit 108 is determined using GPS receivers.

DTV location server 110 receives information describing the phase center (i.e., the location) of each DTV transmitter 106 from a database 112. In one implementation, the phase center of each DTV transmitter 106 is measured by using monitor units 108 at different locations to measure the phase center directly. In another implementation, the phase center of each DTV transmitter 106 is measured by surveying the antenna phase center.

In one implementation, DTV location server 110 receives weather information describing the air temperature, atmospheric pressure, and humidity in the vicinity of user terminal 102 from a weather server 114. The weather information is available from the Internet and other sources such as NOAA. DTV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

DTV location server 110 can also receive from base station 104 information which identifies a general geographic location of user terminal 102. For example, the information can identify a cell or cell sector within which a cellular telephone is located. This information is used for ambiguity resolution, as described below.

Figure 3:
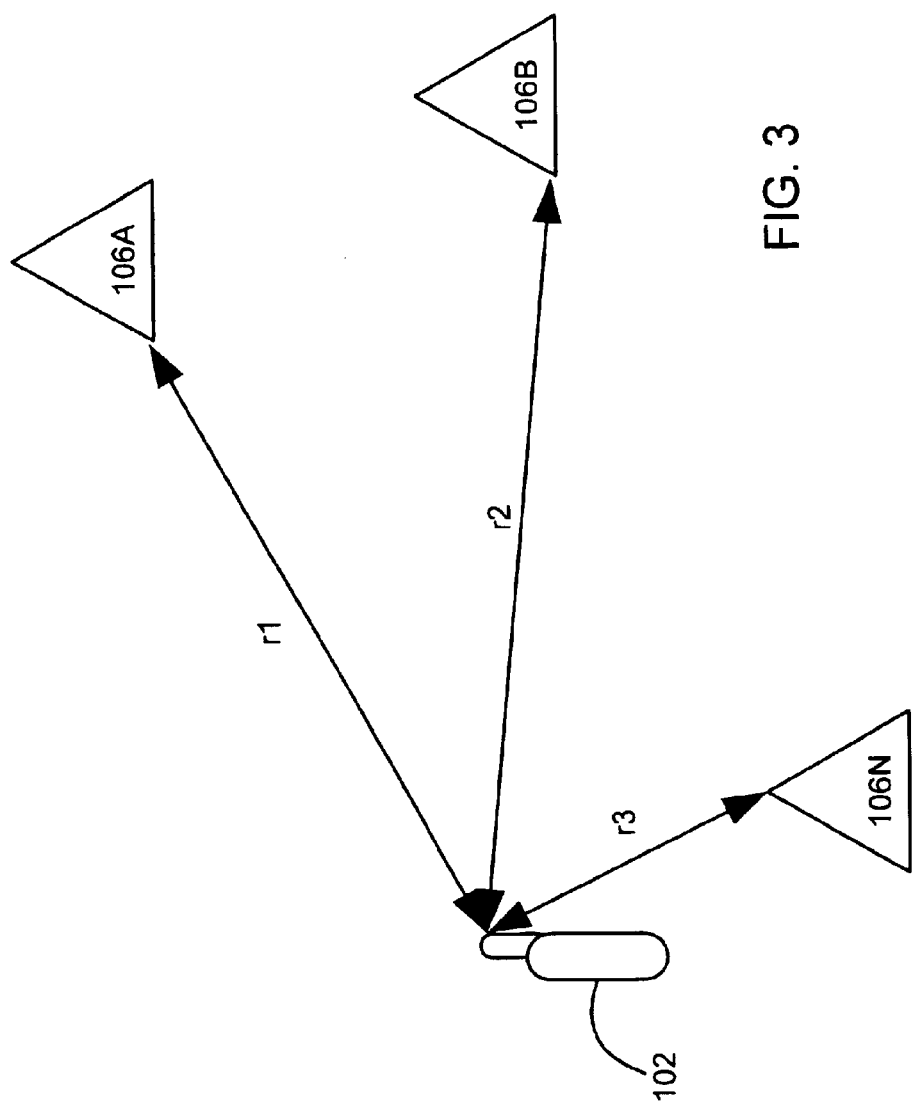
FIG. 3 depicts the geometry of a position determination using 3 DTV transmitters.

DTV location server 110 determines a position of the user terminal based on the pseudo-ranges and a location of each of the transmitters (step 206). FIG. 3 depicts the geometry of a position determination using three DTV transmitters 106. DTV transmitter 106A is located at position (x1, y1). The range between user terminal 102 and DTV transmitter 106A is r1. DTV 106B transmitter is located at position (x2, y2).

The range between user terminal 102 and DTV transmitter 106B is r2. DTV transmitter 106N is located at position (x3, y3). The range between user terminal 102 and DTV transmitter 106N is r3.

DTV location server 110 may adjust the value of each pseudo-range according to the tropospheric propagation velocity and the time offset for the corresponding DTV transmitter 106. DTV location server 110 uses the phase center information from database 112 to determine the position of each DTV transmitter 106.

User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and pr3 are given by $$pr1 = r1 + T \quad (2a)$$

$$pr2 = r2 + T \quad (3a)$$

$$pr3 = r3 + T \quad (4a)$$

The three ranges can be expressed as $$r1 = |X - X1| \quad (5)$$

$$r2 = |X - X2| \quad (6)$$

$$r3 = |X - X3| \quad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and X3 represents the two-dimensional vector position (x3, y3) of DTV transmitter 106N. These relationships produce three equations in which to solve for the three unknowns x, y, and T. DTV locations server 110 solves these equations according to conventional well-known methods. In an E911 application, the position of user terminal 102 is transmitted to E911 location server 116 for distribution to the proper authorities. In another application, the position is transmitted to user terminal 102.

Now, techniques for projecting the measurements at the user terminal 102 to a common instant in time are described. Note that this is not necessary if the clock of the user terminal 102 is stabilized or corrected using a signal from the cellular base station or a DTV transmitter 106. When the user clock is not stabilized, or corrected, the user clock offset can be considered to be a function of time, T(t). For a small time interval, Δ, the clock offset, T(t), can be modeled by a constant and a first order term. Namely, $$T(t+\Delta) = T(t) + \frac{\partial T}{\partial t}\Delta \quad (8)$$

We now reconsider equations (2a)–(4a) treating the clock offset as a function of time. Consequently, the pseudo-range measurements are also a function of time. For clarity, we assume that the ranges remain essentially constant over the interval Δ. The pseudo-range measurements may be described as:

$$pr1(t1) = r1 + T(t1) \quad (2b)$$

$$pr2(t2) = r2 + T(t2) \quad (3b)$$

$$prN(tN) = rN + T(tN) \quad (4b)$$

In one embodiment, the user terminal 102 commences with an additional set of pseudo-range measurements at some time Δ after the initial set of measurements. These measurements may be described:

$$pr1(t1 + \Delta) = r1 + T(t1) + \frac{\partial T}{\partial t}\Delta \quad (2c)$$

$$pr2(t2 + \Delta) = r2 + T(t2) + \frac{\partial T}{\partial t}\Delta \quad (3c)$$

$$prN(tN + \Delta) = rN + T(tN) + \frac{\partial T}{\partial t}\Delta \quad (4c)$$

The user terminal 102 then projects all the pseudo-range measurements to some common point in time so that the effect of the first order term is effectively eliminated. For example, consider if some common reference time t0 is used. Applying equations (2b–4b) and (2c–4c) it is straightforward to show that we can project the measurements to a common instant of time as follows:

$$pr1(t0) = pr1(t1) + [pr1(t1+\Delta) - pr1(t1)](t0-t1)/\Delta \quad (2d)$$

$$pr2(t0) = pr2(t2) + [pr2(t2+\Delta) - pr2(t2)](t0-t2)/\Delta \quad (3d)$$

$$prN(t0) = prN(tN) + [prN(tN+\Delta) - prN(tN)](t0-tN)/\Delta \quad (4d)$$

These projected pseudo-range measurements are communicated to the location server where they are used to solve the three unknowns x, y, and T. Note that the projection in equations (2d–4d) is not precise, and second order terms are not accounted for. However the resulting errors are not significant. One skilled in the art will recognize that second order and higher terms may be accounted for by making more than two pseudo-range measurements for each projection. Notice also that there are many other approaches to implementing this concept of projecting the pseudo-range measurements to the same instant of time. One approach, for example, is to implement a delay lock loop such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein. A separate tracking loop can be dedicated to each DTV transmitter 106. These tracking loops effectively interpolate between pseudo-range measurements. The state of each of these tracking loops is sampled at the same instant of time.

In another implementation, user terminal 102 does not compute pseudo-ranges, but rather takes measurements of the DTV signals that are sufficient to compute pseudo-range, and transmits these measurements to DTV location server 110. DTV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by DTV location server 110, base station 104, one or more DTV transmitters 106, or any combination thereof. User terminal 102 then measures the pseudo-ranges and solves the simultaneous equations as described above. This implementation is now described.

User terminal 102 receives the time offset between the local clock of each DTV transmitter and a reference clock.

User terminal 102 also receives information describing the phase center of each DTV transmitter 106 from a database 112.

User terminal 102 receives the tropospheric propagation velocity computed by DTV locations server 110. In another implementation, user terminal 102 receives weather information describing the air temperature, atmospheric pressure, and humidity in the vicinity of user terminal 102 from a weather server 114, and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives DTV signals from a plurality of DTV transmitters 106 and determines a pseudo-range between the user terminal 102 and each DTV transmitter 106. User terminal 102 then determines its position based on the pseudo-ranges and the phase centers of the transmitters.

In any of these of the implementations, should only two DTV transmitters be available, the position of user terminal 102 can be determined using the two DTV transmitters and the offset T computed during a previous position determination. The values of T can be stored or maintained according to conventional methods.

In one implementation, base station 104 determines the clock offset of user terminal 102. In this implementation, only two DTV transmitters are required for position determination. Base station 104 transmits the clock offset T to DTV location server 110, which then determines the position of user terminal 102 from the pseudo-range computed for each of the DTV transmitters.

In another implementation, when only one or two DTV transmitters are available for position determination, GPS is used to augment the position determination.

Receiver Architecture

Figure 4:
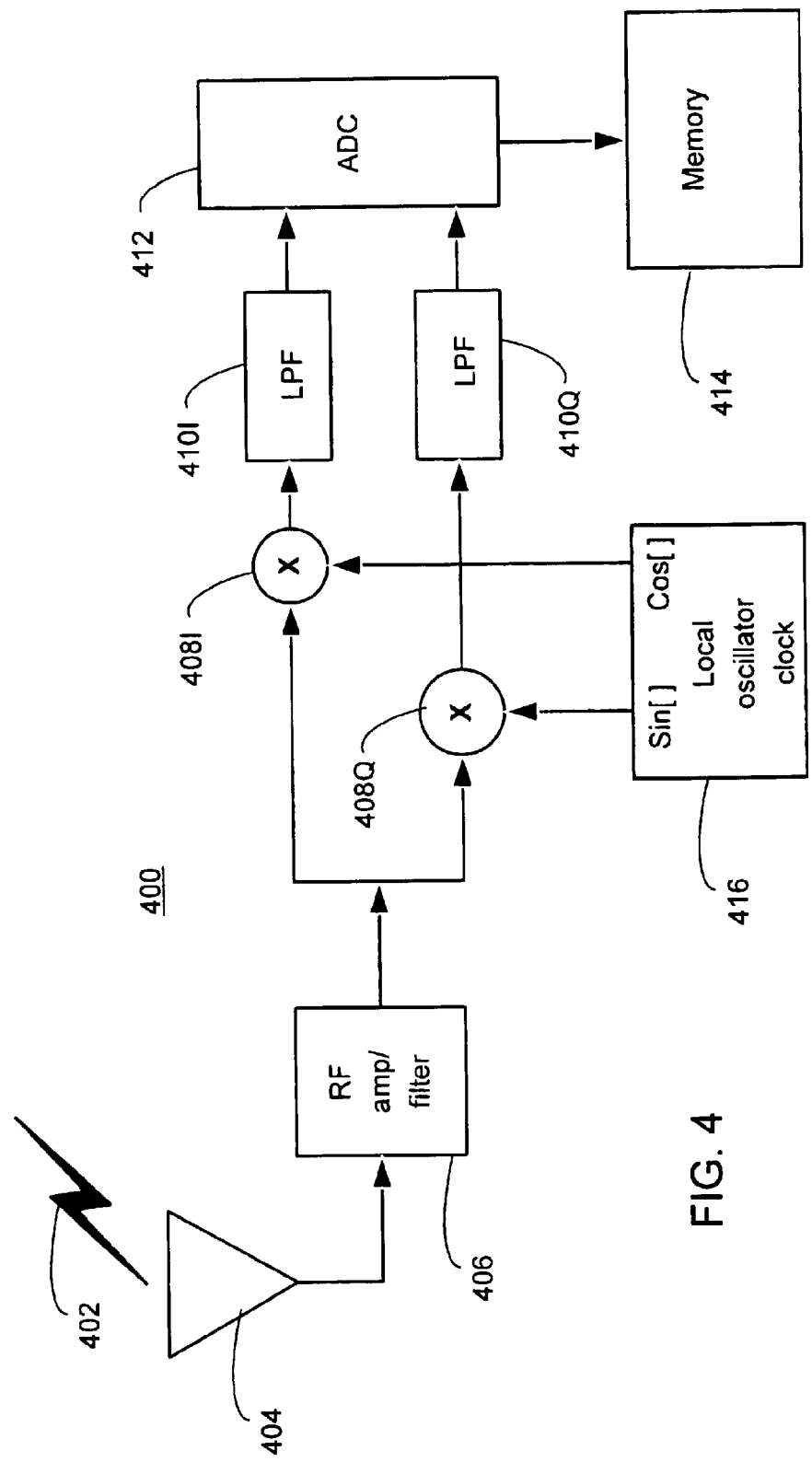
FIG. 4 depicts an implementation of a sampler for use in taking samples of received DTV signals.

FIG. 4 depicts an implementation 400 of a sampler for use in taking samples of received DTV signals. In one implementation, sampler 400 is implemented within user terminal 102. In another implementation, sampler 400 is implemented within monitor units 108. The sampling rate should be sufficiently high to obtain an accurate representation of the DTV signal, as would be apparent to one skilled in the art.

Sampler 400 receives a DTV signal 402 at an antenna 404. A radio frequency (RF) amp/filter 406 amplifies and filters the received DTV signal. A local oscillator clock 416 and mixers 408I and 408Q downconvert the signal to produce in-phase (I) and quadrature (Q) samples, respectively. The I and Q samples are respectively filtered by low-pass filters (LPF) 410I and 410Q. An analog-to-digital converter (ADC) 412 converts the I and Q samples to digital form. The digital I and Q samples are stored in a memory 414.

Figure 5:
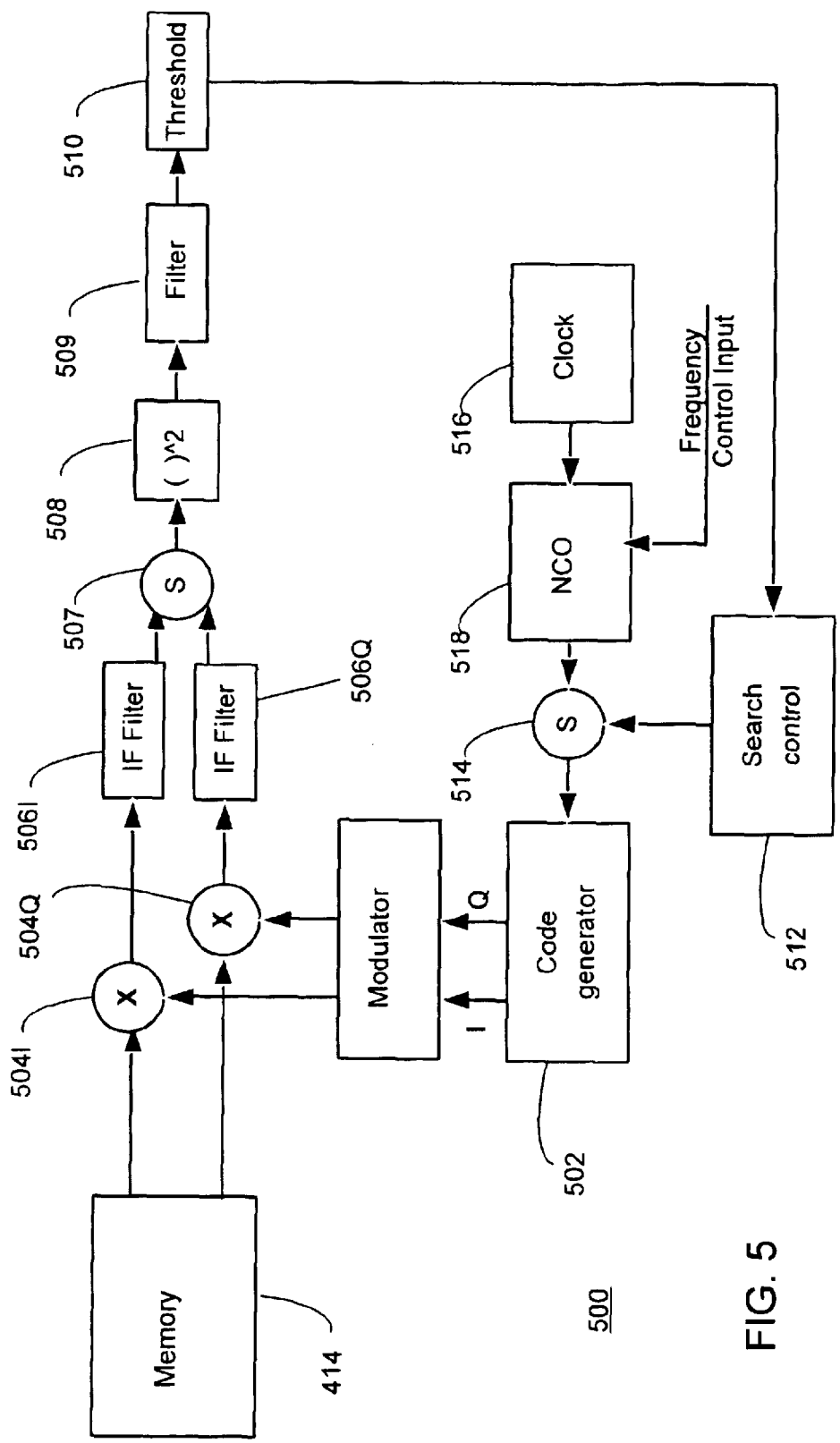
FIG. 5 depicts an implementation of a noncoherent correlator for use in searching for the correlation peak of the DTV signal samples produced by the sampler of FIG. 4.

FIG. 5 depicts an implementation 500 of a noncoherent correlator for use in searching for the correlation peak of the DTV signal samples produced by sampler 400. In one implementation, correlator 500 is implemented within user terminal 102. In another implementation, correlator 500 is implemented within monitor units 108.

Correlator 500 retrieves the I and Q samples of a DTV signal from memory 414. Correlator 500 processes the samples at intermediate frequency (IF). Other implementations process the samples in analog or digital form, and can operate at intermediate frequency (IF) or at baseband.

A code generator 502 generates a code sequence. In one implementation, the code sequence is a raised cosine waveform. The code sequence can be any known digital sequence in the ATSC frame. In one implementation, the code is a synchronization code. In one implementation, the synchronization code is a Field Synchronization Segment within an ATSC data frame. In another implementation, the synchronization code is a Synchronization Segment within a Data Segment within an ATSC data frame. In still another implementation, the synchronization code includes both the Field Synchronization Segment within an ATSC data frame and the Synchronization Segments within the Data Segments within an ATSC data frame.

Mixers 504I and 504Q respectively combine the I and Q samples with the code generated by code generator 502. The outputs of mixers 504I and 504Q are respectively filtered by filters 506I and 506Q and provided to summer 507. The sum is provided to square law device 508. Filter 509 performs an envelope detection for non-coherent correlation, according to conventional methods. Comparator 510 compares the correlation output to a predetermined threshold. If the correlation output falls below the threshold, search control 512 causes summer 514 to add additional pulses to the clocking waveform produced by clock 516, thereby advancing the code generator by one symbol time, and the process repeats. In a preferred embodiment, the clocking waveform has a nominal clock rate of 10.76 MHz, matching the clock rate or symbol rate the received DTV signals.

When the correlation output first exceeds the threshold, the process is done. The time offset that produced the correlation output is used as the pseudo-range for that DTV transmitter 106.

In receiver correlators and matched filters there are two important sources of receiver degradation. The user terminal local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the integration time of the receiver and hence the processing gain of the receiver. The integration time can be increased by correcting the receiver reference clock. In one implementation a delay lock loop automatically corrects for the receiver clock.

In another implementation a NCO (numerically controlled oscillator) 518 adjusts the clock frequency of the receiver to match that of the incoming received signal clock frequency and compensate for drifts and frequency offsets of the local oscillator in user terminal 102. Increased accuracy of the clock frequency permits longer integration times and better performance of the receiver correlator. The frequency control input of NCO 518 can be derived from several possible sources, a receiver symbol clock rate synchronizer, tracking of the ATSC pilot carrier, or other clock rate discriminator techniques installed in NCO 518.

Position Location Enhancements

Figure 6:
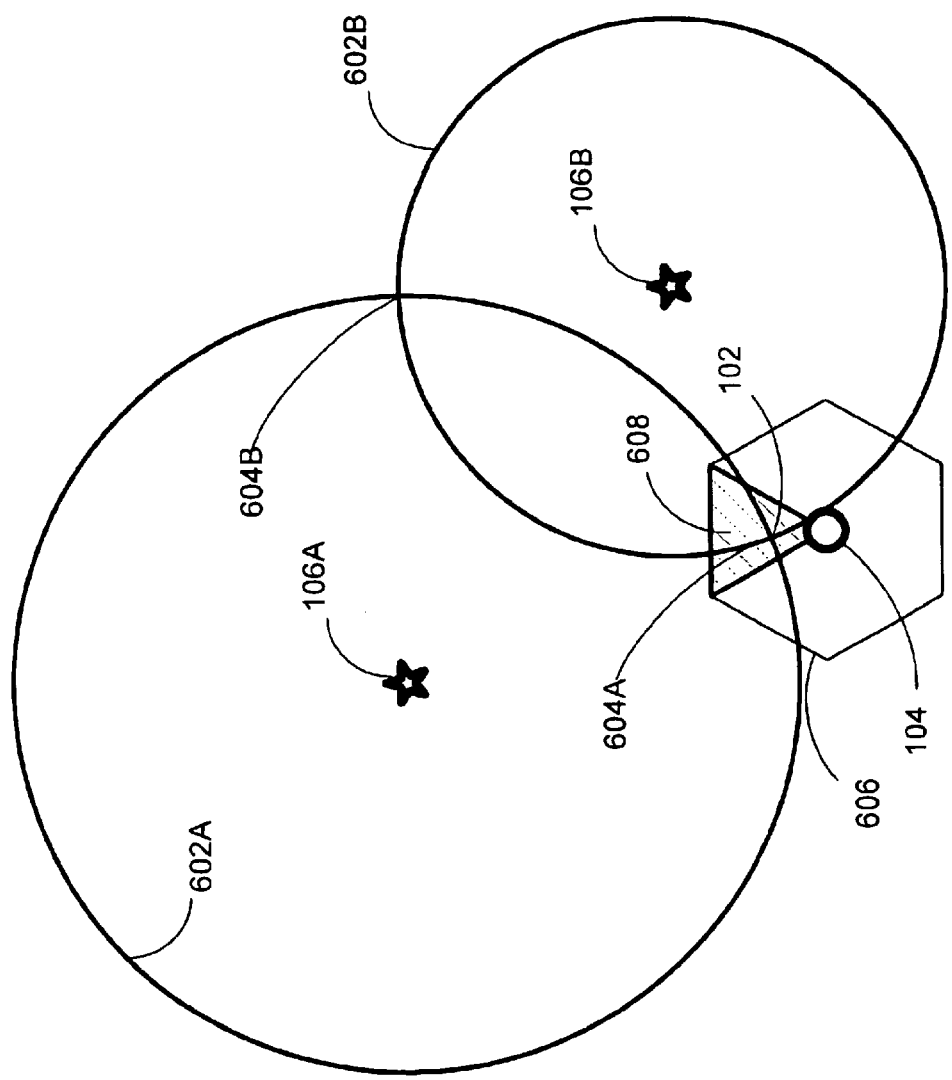
FIG. 6 illustrates a simple example of a position location calculation for a user terminal receiving DTV signals from two separate DTV antennas.

FIG. 6 illustrates a simple example of a position location calculation for a user terminal 102 receiving DTV signals from two separate DTV antennas 106A and 106B. Circles of constant range 602A and 602B are drawn about each of transmit antennas 106A and 106B, respectively. The position for a user terminal, including correction for the user terminal clock offset, is then at one of the intersections 604A and 604B of the two circles 602A and 602B. The ambiguity is resolved by noting that base station 104 can determine in which sector 608 of its footprint (that is, its coverage area) 606 the user terminal is located. Of course if there are more than two DTV transmitters in view, the ambiguity can be resolved by taking the intersection of three circles.

In one implementation, user terminal 102 can accept an input from the user that gives a general indication of the area, such as the name of the nearest city. In one implementation, user terminal 102 scans available DTV channels to assemble a fingerprint of the location. User terminal 102 compares this fingerprint to a stored table that matches known fingerprints with known locations to identify the current location of user terminal 102.

Figure 7:
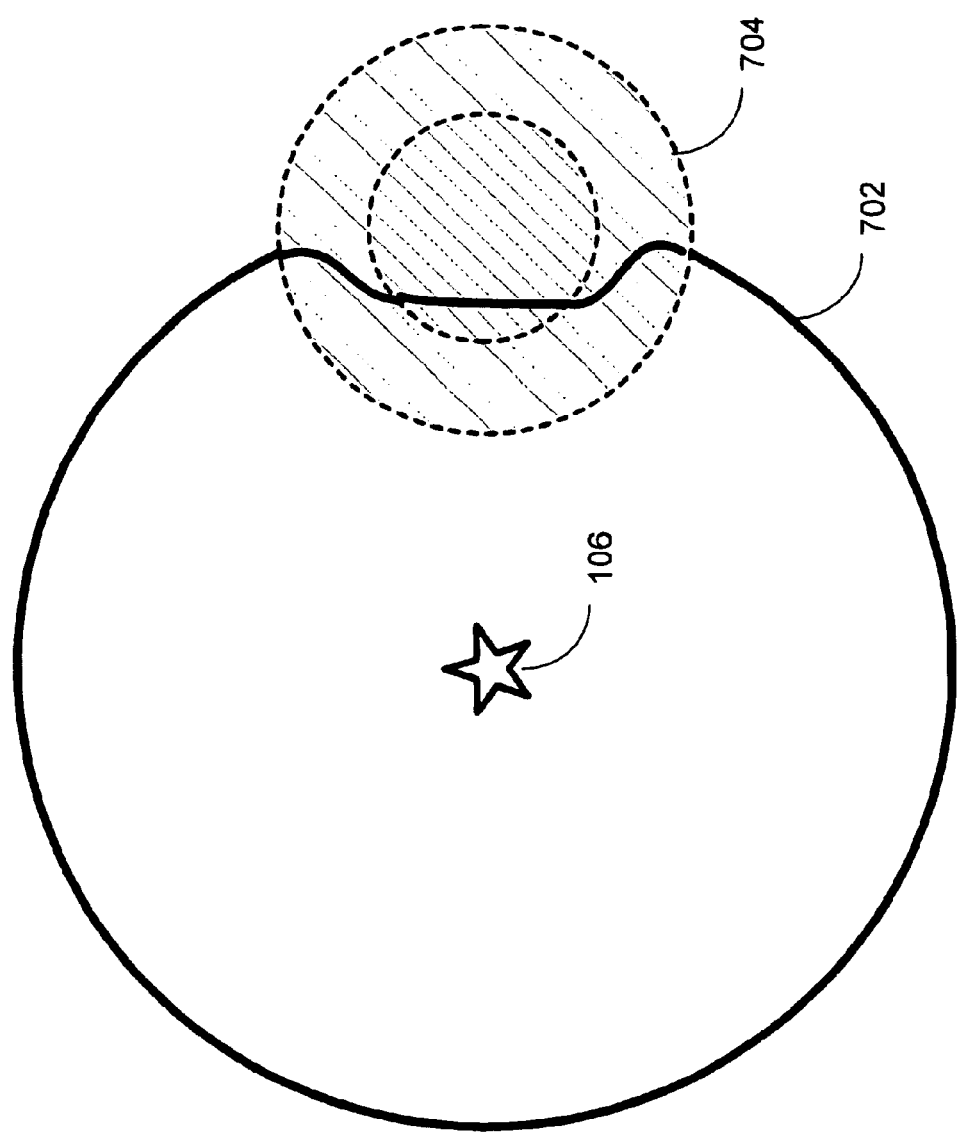
FIG. 7 depicts the effects of a single hill on a circle of constant range for a DTV transmitter that is located at the same altitude as the surrounding land.

In one implementation the position location calculation includes the effects of ground elevation. Thus in terrain with hills and valleys relative to the phase center of the DTV antenna 106 the circles of constant range are distorted. FIG. 7 depicts the effects of a single hill 704 on a circle of constant range 702 for a DTV transmitter 106 that is located at the same altitude as the surrounding land.

The computations of user position are easily made by a simple computer having as its database a terrain topographic map which allows the computations to include the effect of user altitude on the surface of the earth, the geoid. This calculation has the effect of distorting the circles of constant range as shown in FIG. 7.

ATSC Signal Description

Figure 8:
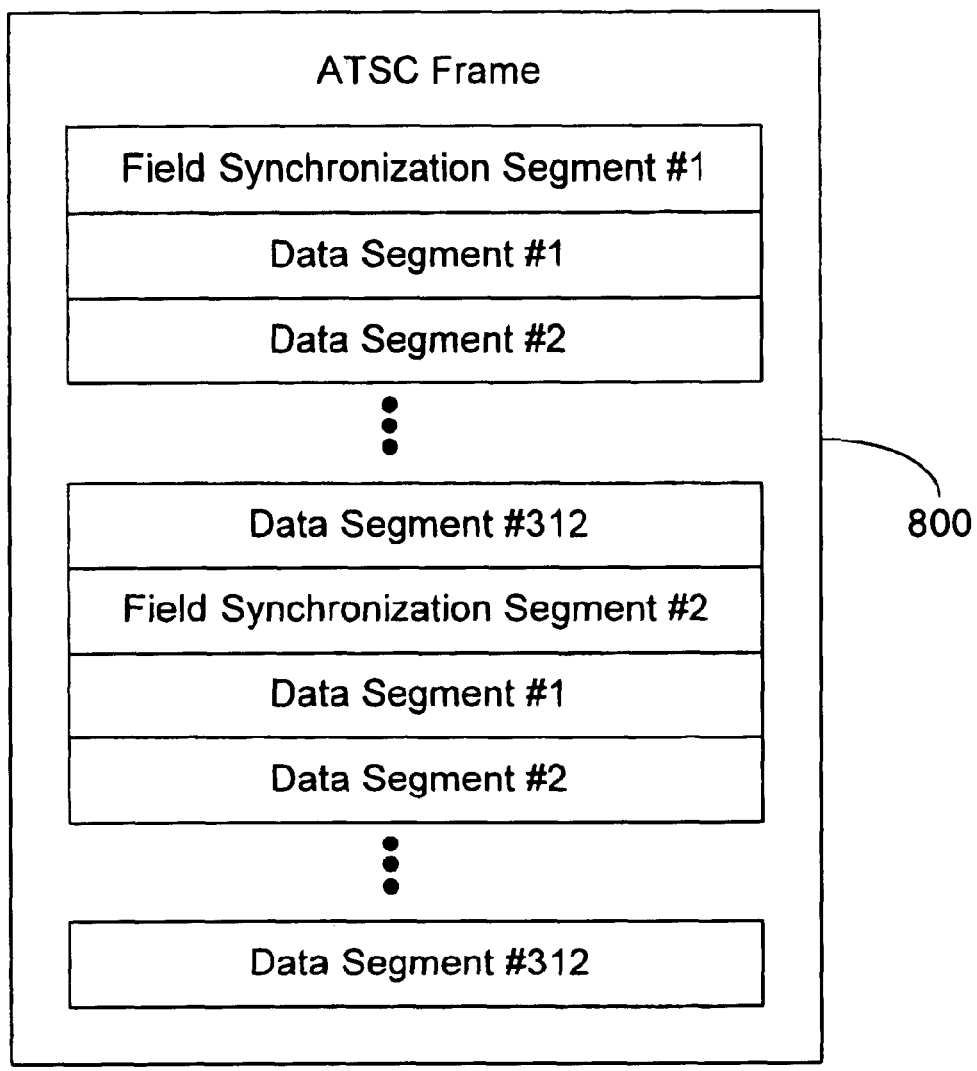
FIG. 8 illustrates the structure of the ATSC frame.

The current ATSC signal is described in "ATSC Digital Television Standard and Amendment No. 1," Mar. 16, 2000, by the Advanced Television Systems Committee. The ATSC signal uses 8-ary Vestigial Sideband Modulation (8VSB). The symbol rate of the ATSC signal is 10.762237 MHz, which is derived from a 27.000000 MHz clock. The structure 800 of the ATSC frame is illustrated in FIG. 8. The frame 800 consists of a total of 626 segments, each with 832 symbols, for a total of 520832 symbols. There are two field synchronization segments in each frame. Following each field synchronization segment are 312 data segments. Each segment begins with 4 symbols that are used for synchronization purposes.

The structure 900 of the field synchronization segment is illustrated in FIG. 9. The two field synchronization segments 900 in a frame 800 differ only to the extent that the middle set of 63 symbols are inverted in the second field synchronization segment.

The structure 1000 of the data segment is illustrated in FIG. 10. The first four symbols of data segment 1000 (which are −1, 1, 1, −1) are used for segment synchronization. The other 828 symbols in data segment 1000 carry data. Since the modulation scheme is 8VSB, each symbol carries 3 bits of coded data. A rate 2/3 coding scheme is used.

Implementations of the invention can be extended to use future enhancements to DTV signals. For example, the ATSC signal specification allows for a high rate 16VSB signal. However, the 16VSB signal has the same field synch pattern as the 8VSB signal. Therefore, a single implementation of the present invention can be designed to work equally well with both the 8VSB and the 16VSB signal.

Figure 11:
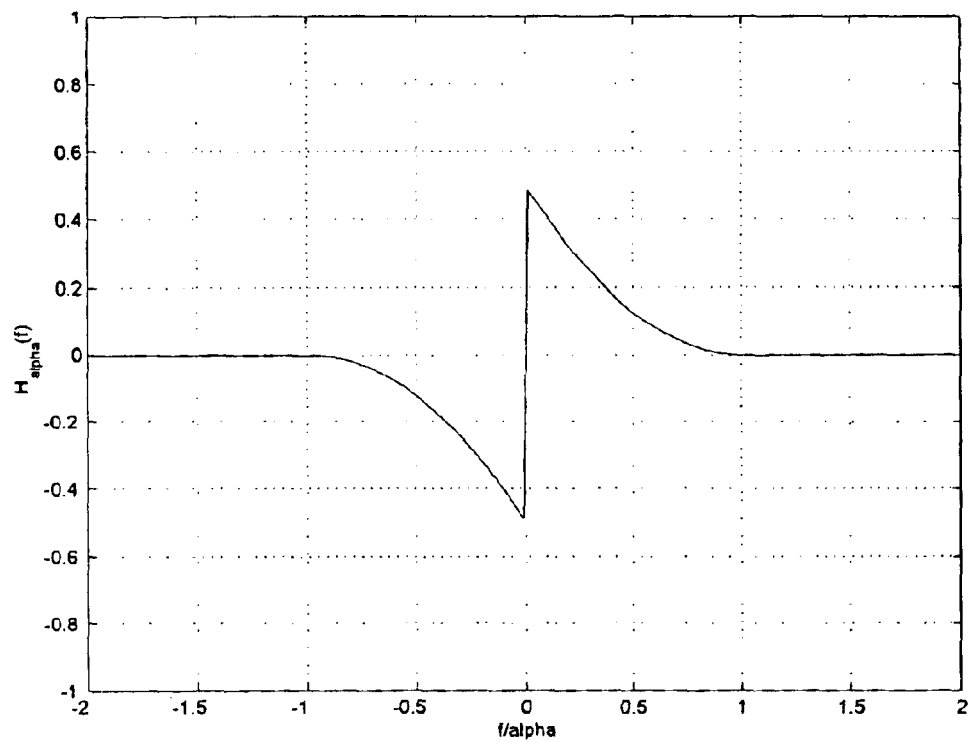
FIG. 11 shows a plot of the gain function for a filter used in producing an ATSC DTV signal.

The 8VSB signal is constructed by filtering. The in-phase segment of the symbol pulse has a raised-cosine characteristic, as described in J. G. Proakis, Digital Communications, McGraw-Hill, $3^{rd}$ edition, 1995. The pulse can be described as $$p(t) = \text{sinc}\left(\frac{\pi t}{T}\right) \frac{\cos\left(\frac{\pi \beta t}{T}\right)}{1 - \frac{4\beta^2 t^2}{T^2}} \tag{8}$$

where T is the symbol period $$T = \frac{1}{10.76 \times 10^6} \tag{9}$$

and $\beta=0.5762$. This signal has a frequency characteristic $$P(f) = \begin{cases} T & \left(0 \le |f| \le \frac{1-\beta}{2T}\right) \\ \frac{T}{2}\left\{1 + \cos\left[\frac{\pi T}{\beta}\left(|f| - \frac{1-\beta}{2T}\right)\right]\right\} & \left(\frac{1-\beta}{2T} \le |f| \le \frac{1+\beta}{2T}\right) \\ 0 & \left(|f| > \frac{1+\beta}{2T}\right) \end{cases} \tag{10}$$

from which it is clear that the one-sided bandwidth of the signal is (1+β)10.762237 MHz=5.38 MHz+0.31 MHz. In order to create a VSB signal from this in-phase pulse, the signal is filtered so that only a small portion of the lower sideband remains. This filtering can be described as:

$$P_v(f) = P(f)(U(f) - H_\alpha(f)) \tag{11}$$

where $$U(f) = \begin{cases} 1, & f \ge 0 \\ 0, & f < 0 \end{cases} \tag{12}$$

where $H_\alpha(f)$ is a filter designed to leave a vestigial remainder of the lower sideband. A plot of the gain function for $H_\alpha(f)$ is shown in FIG. 11. The filter satisfies the characteristics $H_\alpha(-f)=-H_\alpha(f)$ and $H_\alpha(f)=0$, f>α.

The response $U(f)P(f)$ can be represented as $$U(f)P(f) = \frac{1}{2}\left(P(f) + j\check{P}(f)\right) \tag{13}$$

where $\check{P}(f) = -j\, \text{sgn}(f)P(f)$ is the Hilbert transform of $P(f)$. The VSB pulse may be represented as $$P_v(f) = \frac{1}{2}X(f) + \frac{j}{2}\left(\check{X}(f) + 2X(f)H_\alpha(f)\right) \tag{14}$$

and the baseband pulse signal $$p_v(t) = \frac{1}{2}x(t) + \frac{j}{2}\left(\check{x}(t) + x_\alpha(t)\right) = p_{vi}(t) + jp_{vq}(t) \tag{15}$$

where $p_{vi}(t)$ is the in-phase component, $p_{vq}(t)$ is the quadrature component, and $$x_\alpha(t) = 2\int_{-\alpha}^{\alpha} X(f)H_\alpha(f)e^{j2\pi ft}df \tag{16}$$

Before the data is transmitted, the ATSC signal also embeds a carrier signal, which has −11.5 dB less power than the data signal. This carrier aids in coherent demodulation of the signal. Consequently, the transmitted signal can be represented as:

$$s(t) = \sum_n C_n\{p_{vi}(t-nT)\cos(\omega t) - p_{vq}(t-nT)\sin(\omega t)\} + A\cos(\omega t) \tag{17}$$

where $C_n$ is the 8-level data signal.

Monitor Units

Figure 12:
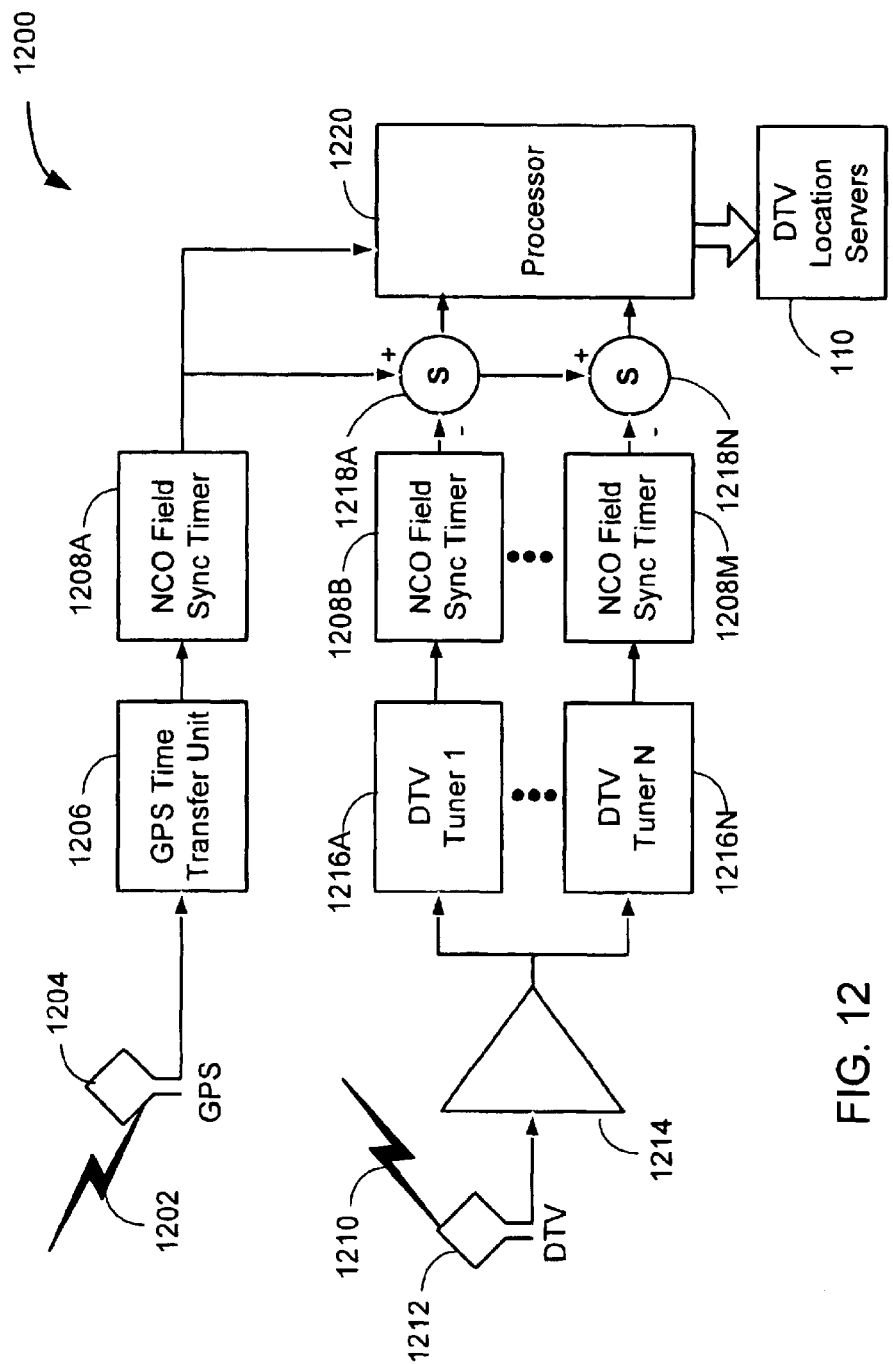
FIG. 12 depicts an implementation of a monitor unit.

FIG. 12 depicts an implementation 1200 of monitor unit 108. An antenna 1204 receives GPS signals 1202. A GPS time transfer unit 1206 develops a master clock signal based on the GPS signals. In order to determine the offset of the DTV transmitter clocks, a NCO (numerically controlled oscillator) field synchronization timer 1208A develops a master synchronization signal based on the master clock signal. The master synchronization signal can include one or both of the ATSC segment synchronization signal and the ATSC field synchronization signal. In one implementation, the NCO field synchronization timers 1208A in all of the monitor units 108 are synchronized to a base date and time. In implementations where a single monitor unit 108 receives DTV signals from all of the same DTV transmitters that user terminal 102 does, it is not necessary to synchronize that monitor unit 108 with any other monitor unit for the purposes of determining the position of user terminal 102. Such synchronization is also unnecessary if all of the monitor stations 108, or all of the DTV transmitters, are synchronized to a common clock.

A DTV antenna 1212 receives a plurality of DTV signals 1210. In another implementation, multiple DTV antennas are used. An amplifier 1214 amplifies the DTV signals. One or more DTV tuners 1216A through 1216N each tunes to a DTV channel in the received DTV signals to produce a DTV channel signal. Each of a plurality of NCO field synchronization timers 1208B through 1208M receives one of the DTV channel signals. Each of NCO field synchronization timers 1208B through 1208M extracts a channel synchronization signal from a DTV channel signal. The channel synchronization signal can include one or both of the ATSC segment synchronization signal and the ATSC field synchronization signal. Note that the pilot signal and symbol clock signal within the DTV signal can be used as acquisition aids.

Each of a plurality of summers 1218A through 1218N generates a clock offset between the master synchronization signal and one of the channel synchronization signals. Processor 1220 formats and sends the resulting data to DTV location server 110. In one implementation, this data includes, for each DTV channel measured, the identification number of the DTV transmitter, the DTV channel number, the antenna phase center for the DTV transmitter, and the clock offset. This data can be transmitted by any of a number of methods including air link and the Internet. In one implementation, the data is broadcast in spare MPEG packets on the DTV channel itself.

Software Receivers

One thorough approach to mitigating the effects of multipath is to sample an entire autocorrelation function, rather than to use only early and late samples as in a hardware setup. Multipath effects can be mitigated by selecting the earliest correlation peak.

In the case that position can be computed with a brief delay, such as in E911 applications, a simple approach is to use a software receiver, which samples a sequence of the filtered signal, and then processes the sample in firmware on a DSP.

Figure 13:
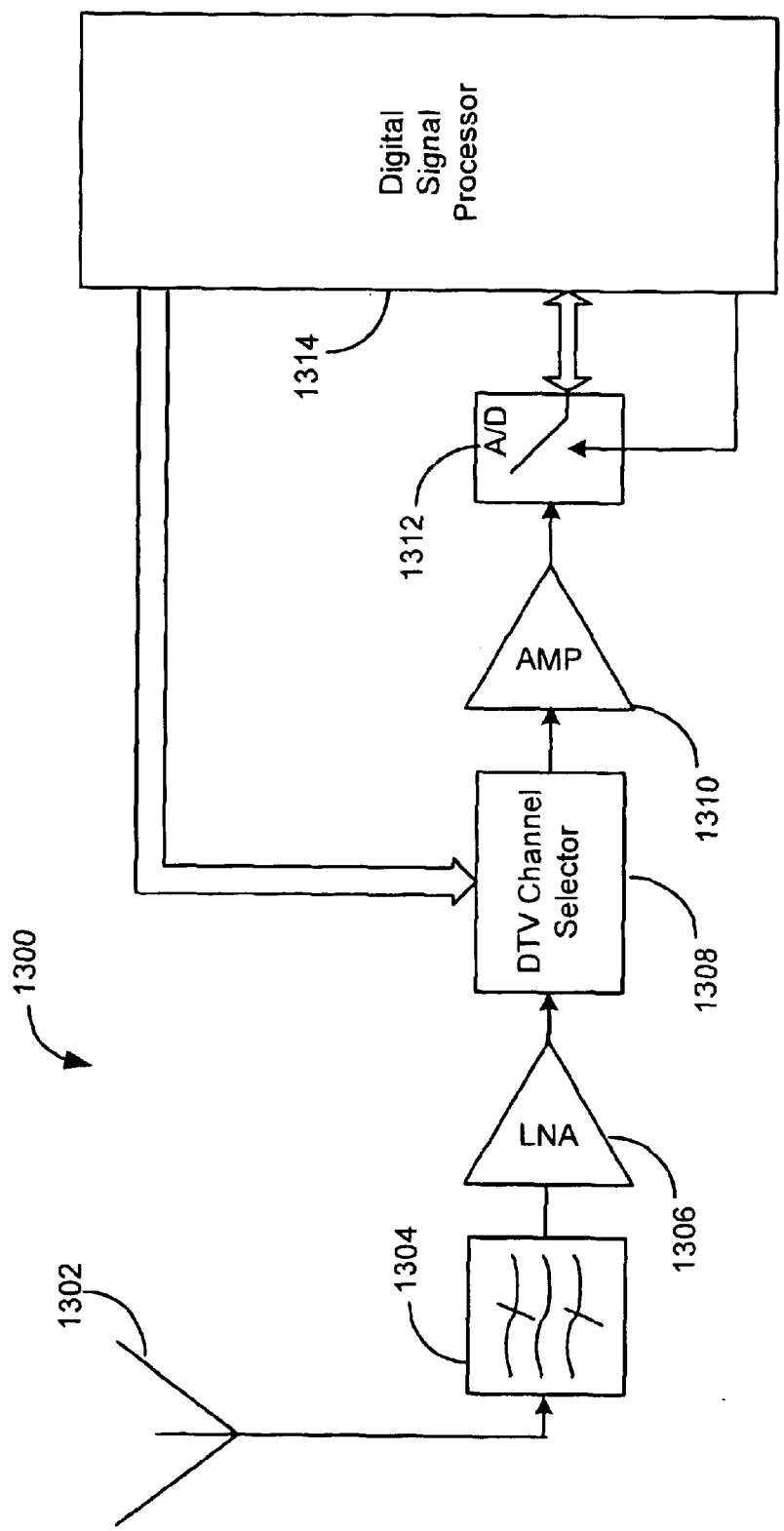
FIG. 13 illustrates one implementation for tracking in software.

FIG. 13 illustrates one implementation 1300 for tracking in software. An antenna 1302 receives a DTV signal. Antenna 1302 can be a magnetic dipole or any other type of antenna capable of receiving DTV signals. A bandpass filter 1304 passes the entire DTV signal spectrum to an LNA 1306. In one implementation, filter 1304 is a tunable bandpass filter that passes the spectrum for a particular DTV channel under the control of a digital signal processor (DSP) 1314.

A low-noise amplifier (LNA) 1306 amplifies and passes the selected signal to a DTV channel selector 1308. DTV channel selector 1308 selects a particular DTV channel under the control of DSP 1314, and filters and downconverts the selected channel signal from UHF (ultra-high frequency) to IF (intermediate frequency) according to conventional methods. An amplifier (AMP) 1310 amplifies the selected IF channel signal. An analog-to-digital converter and sampler (A/D) 1312 produces digital samples of the DTV channel signal s(t) and passes these samples to DSP 1314.

Now the processing of the DTV channel signal by DSP 1314 is described for a coherent software receiver. A nominal offset frequency for the downconverted sampled signal is assumed. If this signal is downconverted to baseband, the nominal offset is 0 Hz. The process generates the complete autocorrelation function based on samples of a signal s(t). The process may be implemented far more efficiently for a low duty factor signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

$R_{max} = 0$

Create a complex code signal $$s_{code}(t) = \Sigma \overline{C}_n \{p_{vi}(t-nT_i) + jp_{vq}(t-nT_i)\}$$

where $\overline{C}_n$ is zero for all symbols corresponding to data signals and non-zero for all symbols corresponding to synchronization signals.

$$\text{For } \omega = \omega_{in} - \omega_{offset} \text{ to } \omega_{in} + \omega_{offset} \text{ step } 0.5 \frac{\pi}{T_i}$$

Create a complex mixing signal $$s_{mix}(t) = \cos(\omega t) + j\sin(\omega t), \; t=[0 \ldots T_i]$$

Combine the incident signal s(t) and the mixing signal $s_{mix}(t)$ $s_{comb}(t) = s(t)s_{mix}(t)$ Compute the correlation function $R(\tau) = s_{code} * s_{comb}(\tau)$ If $\max_\tau |R(\tau)| > R_{max}$, $$R_{max} \leftarrow \max_\tau |R(\tau)|, \; R_{store}(\tau) = R(\tau)$$

Next $\omega$

Upon exit from the process, $R_{store}(\tau)$ will store the correlation between the incident signal s(t) and the complex code signal $s_{code}(t)$. $R_{store}(\tau)$ may be further refined by searching over smaller steps of $\omega$. The initial step size for $\omega$ must be less then half the Nyquist rate $$\frac{2\pi}{T_i}.$$

The time offset $\tau$ that produces the maximum correlation output is used as the pseudo-range.

A technique for generating the non-coherent correlation in software is now described. This approach emulates the hardware receivers of FIGS. 4 and 5. Note that while the I and Q channels are treated separately in the block diagrams, the I and Q components may be combined to generate the mixing signal in software. Since the non-coherent correlator uses envelope detection, it is not necessary to search over a range of intermediate frequencies. The process implements the pseudocode listed below.

Create the in-phase and quadrature code signals $c_i(t) = \Sigma \overline{C}_n p_{vi}(t-nT_i)$, $c_q(t) = \Sigma \overline{C}_n p_{vq}(t-nT_i)$ where the sum is over n, $\overline{C}_n$ is zero for all symbols corresponding to data signals and non-zero for all symbols corresponding to synchronization signals. Note that $c_i$ has autocorrelation $R_i$, $c_q$ has autocorrelation $R_q$, and that their cross-correlation is $R_{iq}$.

For τ=0 to $T_{per}$ step $T_{samp}$ where $T_{per}$ is the period of the code being used, and $T_{samp}$ is the sample interval Create a reference code mixing signal $$s_{mix}(t)=c_i(t+\tau)\cos(\omega t+vt+\phi)+c_q(t+\tau)\sin(\omega t+vt+\phi)$$

where ω is the nominal IF frequency of the incident signal, ν is the frequency offset of the mixing signal relative to the incident signal, and φ is the phase offset of the mixing signal from the incident signal.

Combine the incident signal s(t) and the reference code mixing signal $s_{mix}(t)$.

$$s_{comb}(t)=s(t)s_{mix}(t)$$

Low-pass filter $s_{comb}(t)$ to generate $s_{filt}(t)$ such that the expected value of $s_{filt}(t)$ is given by $E[s_{filt}(t)]=2R_i(\tau)\cos(vt+\phi)+2R_{iq}(\tau)\sin(vt+\phi)$ where we have used that fact that $R_i(\tau)=-R_q(\tau)$ Perform envelope detection on $s_{filt}(t)$ (for example, by squaring and filtering) to generate the non-coherent correlation: $z(\tau)=2[R_i(\tau)^2+R_{iq}(\tau)^2]$ Next τ

The time offset τ that produces the maximum correlation output is used as the pseudo-range.

Figure 14:
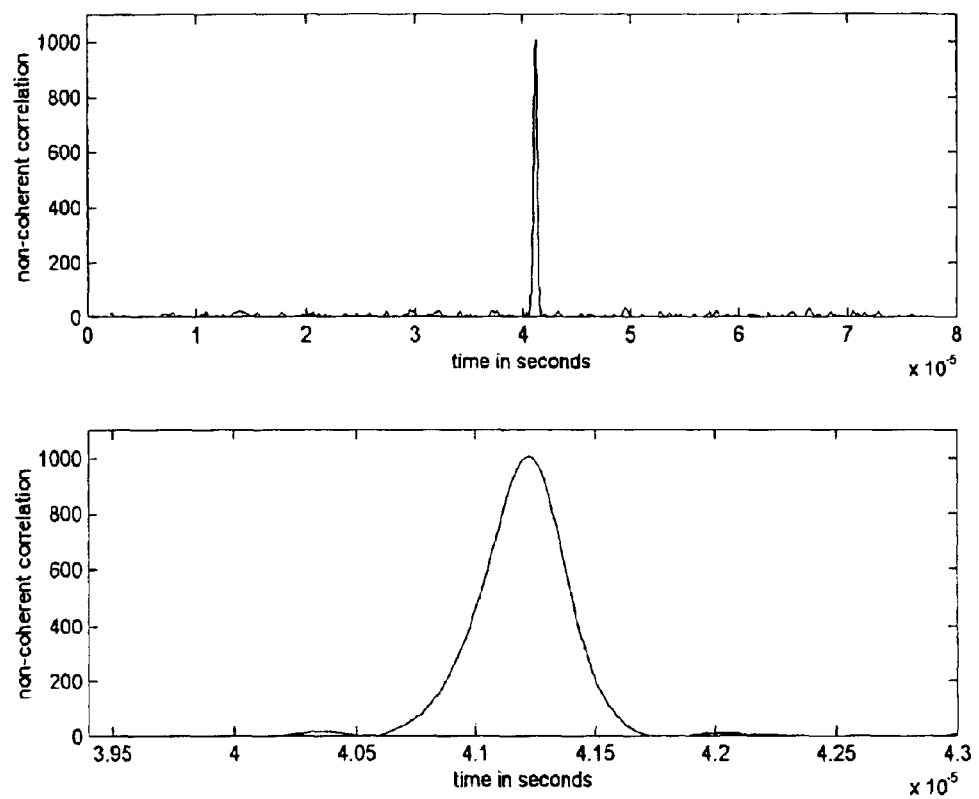
FIG. 14 shows a plot of the output of the non-coherent correlator.

Notice that the non-coherent correlation z(τ) makes use of the signal power in both the in-phase and quadrature components. However, as a result of this, the effective bandwidth of the signal that generates the non-coherent correlation is halved. The output of the non-coherent correlator is illustrated in FIG. 14. The upper plot shows the correlation peak for an interval of roughly $8\times10^{-5}$ seconds. The upper plot shows the effective 3 MHz bandwidth of the correlation peak.

Modified ATSC DTV Signal

The ATSC DTV signal normally carries an 8-ary vestigial sideband (8VSB) signal at a 10.762237 Msps symbol rate and has a raised cosine spectrum of 6 MHz bandwidth. The signal comprises segments of 832 symbols each with 313 segments per half field. However most of the symbols are modulated TV video. Only the first 4 symbols of each segment are segment synchronization signal and only the first segment in a half field is the field synchronization signal.

Embodiments of the present invention employ a positioning signal that is similar to the ATSC DTV signal, but is modified to enhance position determination. In particular, the portions of the DTV signal that are normally used to transmit video content are instead used to transmit a pseudonoise sequence such as the ATSC DTV field synchronization signal. Thus the field synchronization signal is available almost continuously, rather that at a low duty factor, as in the ATSC DTV signal. As a result, the positioning signals of the present invention can be broadcast at relatively low power and using the Industrial, Scientific, and Medical (ISM) frequency bands. Alternatively, the positioning signals can be transmitted at low levels in television frequency bands with FCC approval.

A user terminal can determine its position using this positioning signal alone when available from three or more transmitters, or in conjunction with DTV signals, GPS signals, mobile telephone signals, and/or other signals. For example, the positioning signal can be used to augment a DTV or GPS positioning technique when blockage reduces the strength and number of GPS or DTV signals.

The positioning signal can be transmitted from existing DTV transmitters on a separate channel, or from dedicated transmitters that can be fixed or portable. These dedicated positioning signal transmitters are referred to herein as "pseudo-television (PTV) transmitters." Each PTV transmitter can uniquely identify its signal using the techniques described below to further enhance position determination. In addition, the positioning signals can be used to transmit low-rate data, as described below, which can be received even indoors in difficult environments.

For example, in an entertainment theme park a customer or guest can carry a special handset that provides access to various rides, shows, food, and so on. The same handset can provide location services and can also relay information as to the next event in a nearby building or ride. The handset can also enable families to keep track of one another and aid in locating lost children. Further, in a local area such as a campus, industrial park, theme park or shopping mall, PTV transmitters can be mounted at predetermined altitudes on buildings, towers, and the like to provide three-dimensional position determination, for example to determine on which floor of a building a handset is located.

Figure 15:
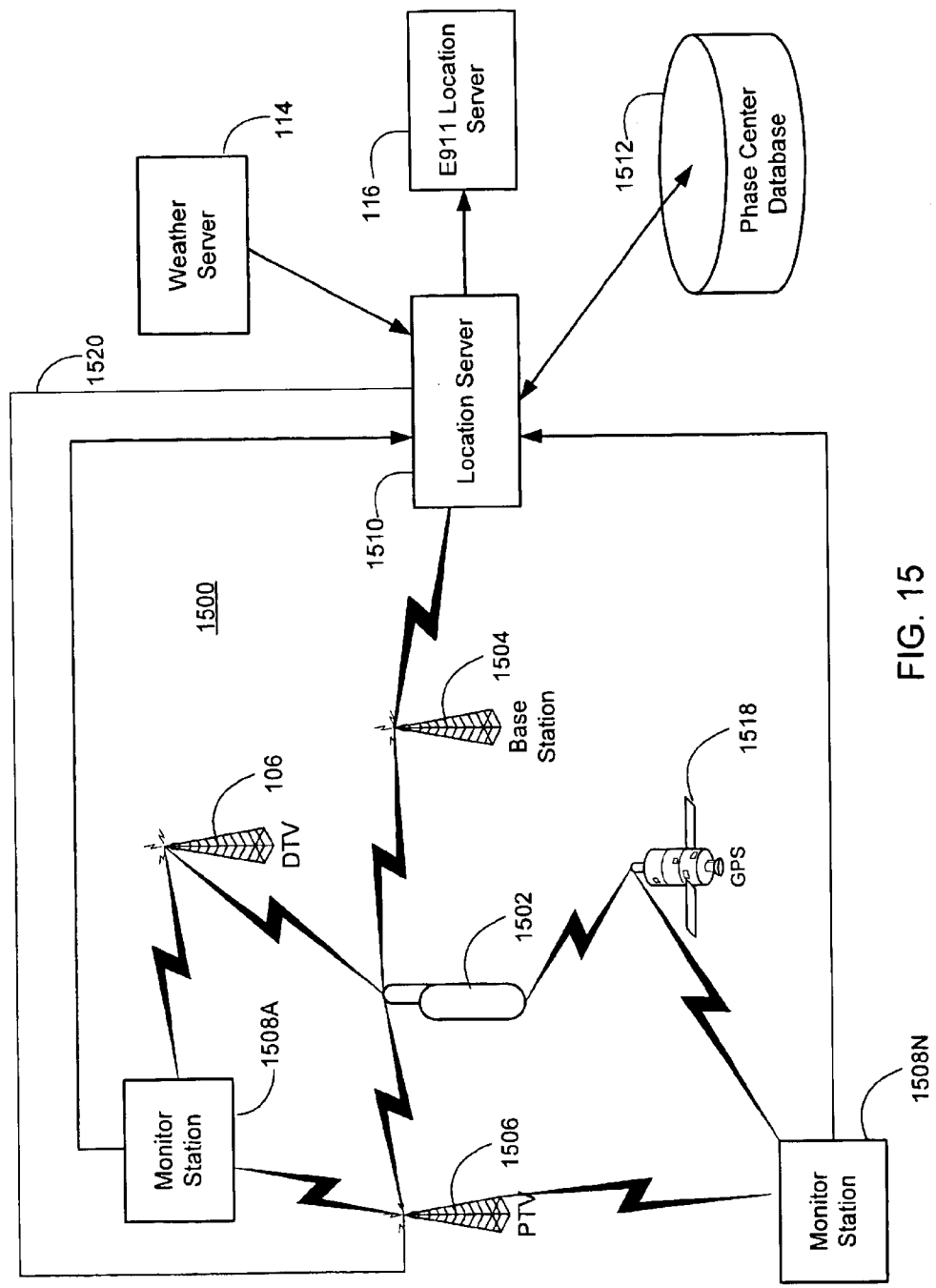
FIG. 15 shows a positioning system according to a preferred embodiment of the invention.

FIG. 15 shows a positioning system 1500 according to a preferred embodiment of the invention. Positioning system 1500 comprises one or more user terminals 1502 and one or more PTV transmitters 1506. Positioning system 1500 optionally comprises one or more DTV transmitters 106 and GPS transmitters 1518. User terminal 1502 communicates with a location server 1510 over a base station 1504. Optional monitor stations 1508A through 1508N receive transmissions from transmitters 1506, 106, and 1518 in order to correct for clock offsets, if necessary, as described above. PTV transmitter 1506 is optionally in communication with location server 1510 over an optional link 1520 such as a local area network (LAN), for example to transmit the position of the PTV transmitter 1506 to location server 1510, to download software updates to PTV transmitter 1506, and the like. PTV transmitter 1506 can include a GPS receiver or the receivers described herein to determine its position based on transmissions from DTV transmitters 106, GPS transmitters 1518, and other PTV transmitters 1506, and preferably comprises a time receiver to receive an accurate time signal such as the GPS or WWV time signals. Positioning system 1500 comprises a phase center database to store the phase centers of PTV transmitters 1506, and also optionally of DTV transmitters 106. Positioning system 1500 also optionally comprises a weather server 114 and an E911 server 116.

Figure 16:
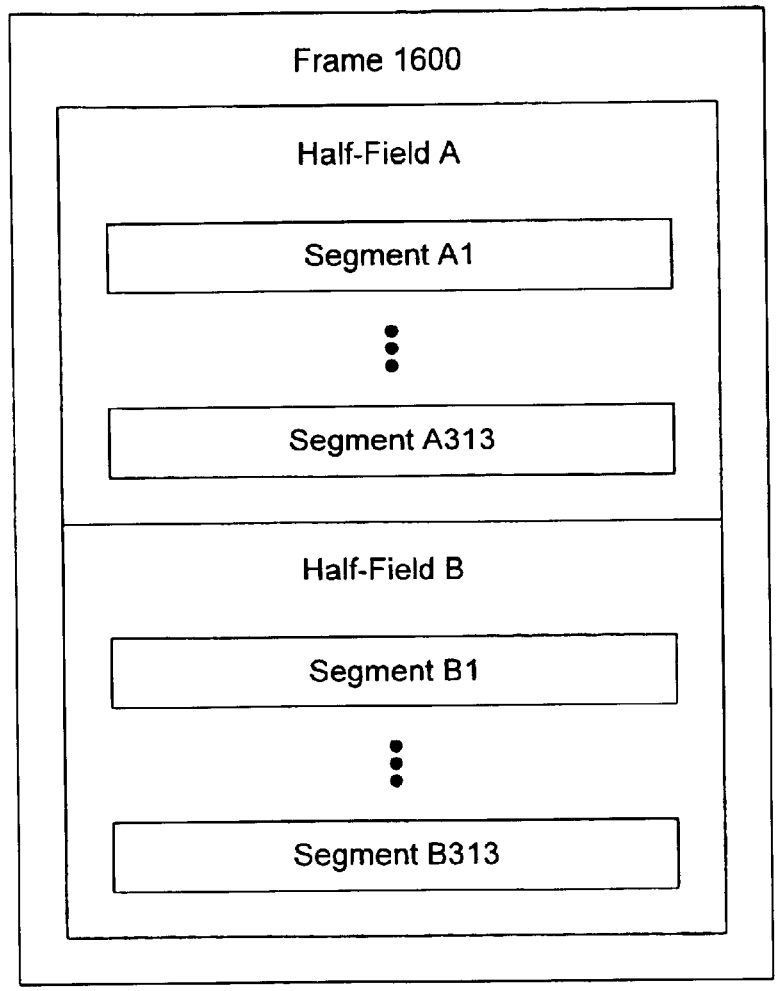
FIG. 16 shows the structure of the positioning signal of the present invention according to a preferred embodiment.

FIG. 16 shows the structure of the positioning signal of the present invention according to a preferred embodiment. Like the ATSC DTV signal, the positioning signal comprises a plurality of frames 1600 each comprising a first half-field A and a second half-field B. Also like the ATSC DTV signal, each of the first and second half-fields A and B comprises 313 segments A1 through A313 and B1 through B313, respectively.

As in the ATSC signal, each segment of the positioning signal contains 832 symbols each at the same 10.762237 Msps symbol rate. The 4-symbol segment synchronization signal is identical to the ATSC format. However, the remaining 828 symbols in each segment comprise a pseudonoise sequence selected to enhance positioning. In some embodiments, the pseudonoise sequence is a portion of an L5 Global Positioning System (GPS) code. In addition, every segment in frame 1600 has this structure, thereby allowing the pseudonoise sequence to be acquired in any segment.

Figure 17:
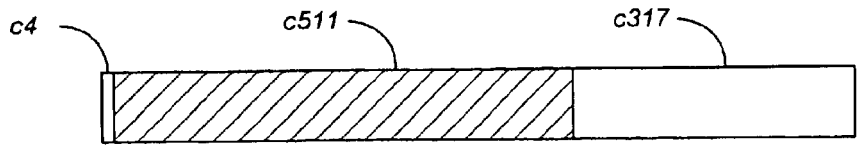
FIG. 17 shows the structure of a segment of a positioning signal based on the ATSC DTV format according to a preferred embodiment.

In some embodiments, the pseudonoise sequence is based on the ATSC DTV format, thereby allowing the receivers described herein to be used to generate pseudoranges based on the positioning signal, DTV signals, or both. FIG. 17 shows the structure of a segment 1700 of a positioning signal based on the ATSC DTV format according to a preferred embodiment. Preferably each of the segments A1 through A313 and B1 through B313 of frame 1600 of the positioning signal have the structure shown in FIG. 17.

Like the first segment of each half-field of the ATSC DTV signal, segment 1700 comprises 832 chips at the same 10.762237 Msps symbol rate as the ATSC DTV signal. Segment 1700 comprises a 4-chip segment synchronization signal c4, followed by a 511-chip field synchronization signal c511, followed by a 317-chip signal c317. However, unlike the ATSC DTV signal, the 317-chip signal c317 comprises a portion of the 511-chip field synchronization signal c511, for example by simply continuing the 511-chip sequence for the rest of the segment. Also unlike the ATSC signal, every segment of frame 1600 preferably has the structure shown in FIG. 17.

The structure of 511-chip field synchronization signal c511 is well-known and specified by the ATSC DTV specification. The 511-chip sequence c511 is given by c511={1, 1,1,1,1,1,1,-1,1,-1,-1,-1,-1,-1,-1,-1,-1,1,1,-1,1,-1, 1,-1, 1,-1,1,-1,-1,-1,1,1,-1,-1,1,1,-1,-1,1,-1,1,1,1,-1,1, 1,1,-1,1,1,-1,-1,-1,-1,1,1,1,1,-1,-1,1,-1,-1,1,-1,-1,-1, -1,-1,1,-1,1,1,-1,-1,1,1,-1,1,-1,1,1,1,-1,-1,-1,1,-1,1,1,1,- 1,-1,-1,1,1,-1,1,1,1,-1,1,1,1,-1,1,-1,-1,1,1,1, -1,-1,-1,1,1, 1,-1,1,1,1,1,1,-1,1,-1,1,1,1,1,-1,-1,-1,-1,-1,1,1,1,-1,-1,-1,-1, 1,-1,1,-1,1,1,1,1,-1,1,-1,1,1,1,-1,-1,1,1,1,1,-1,1,1,1,1,-1,1, 1,1,1,1,-1,1,1,1,1,1,-1,-1,-1,-1,-1,-1,1,1,1,1,1,-1,1,-1,1,1,- 1,1,1,1,1,1,1,-1,-1,1,1,-1,-1,-1,-1,-1,-1,1,-1,-1,-1,-1, 1,-1,1,-1,1,-1,1,1,-1,1,-1,-1,1,1,-1,-1,1,1,1,-1,-1,1,-1,- 1,-1,1,-1,-1,-1,1,1,-1,-1,1,-1,-1,1,1,1,-1,1,-1,1,1,1,-1, 1,-1,-1,1,1,-1,-1,-1,1,1,1,1,-1,-1,-1,-1,1,1,-1,1,1,1,1,- 1,1,-1,1,1,1,-1,-1,-1,-1,1,1,-1,1,1,1,1,-1,-1,1,-1,-1,-1,1, 35 1,-1,-1,-1,-1,1,1,1,-1,-1,1,1,-1,-1,1,-1,1,1,-1,-1,1,-1,-1,-1, 1,-1,1,-1,1,1,-1,1,1,-1,-1,-1,1,-1,-1,-1,1,1,1,-1,1,1,1,1, 1,-1,1,-1,-1,-1,-1,1,1,1,1,-1,-1,-1,1,1,1,-1,1,-1,-1,1,1, 1,1,1,-1,1,1,-1,1,1,-1,1,-1,1,1,1,1,1,-1,1,1,1,-1,-1,1,-1,1, -1,-1,1,1,1,1,-1,1,1,1,-1,1,-1,1,1,-1,-1,-1,-1,1,1,1,1,-1,-1,1,1,1,- 1,1,-1,1,1,1,1,1,-1,1,1,1,1,-1,-1,1,1,1,1,1,1,1,-1,-1, -1,-1,1,1,-1, 1,-1,-1,-1,-1,1,1,-1,1,1,-1,-1,1,1,-1,1,1,-1,-1,1,1,1,-1,1,1,1,1,- 1,-1,1,1,-1,1,1,1,1,-1,-1,-1,1,1,-1,-1,1,-1,1,1,1,1,1,-1,1,-1,1,1, 1,-1,1,1,1,1,1,1,-1,-1,1,1,-1,-1,1,1,1,1,1,1,1,1,-1,1,1,1,-1,1,1,1,1,1, 1,1,1,-1,-1,-1,1}.

In some embodiments, one or both of the half-fields of the positioning signal is modulated using a pseudonoise sequence having a chip rate corresponding to the segment rate, thereby changing the sign of some of the segments according to the pseudonoise sequence. The pseudonoise sequence should have good correlation properties that enable unique identification of the start of each half field and correlation over the entire half field. In some embodiments, each PTV transmitter 1506 employs a different pseudonoise sequence so their signals can easily be distinguished. In some embodiments, the pseudonoise sequence is a Global Positioning System L5 code. In some embodiments, the pseudonoise sequence is a rotated version of the 511-chip field synchronization signal. One such sequence is the following 313-chip sequence c313 given by c313 ={1,1,- 1,1,1,1,1,-1,1,-1,1,1,1,-1,-1,-1,-1,-1,1,1,-1,-1,-1,-1,1,- 1,1,-1,1,1,1,1,-1,-1,1,1,1,-1,-1,1,1,1,1,1,-1,-1,1,1,1,1,-1,1,1,1,1, 1,1,-1,1,1,1,1,1, -1,-1,-1,-1,-1,-1,1,1,1,1,1,1,-1,1,-1,-1,-1,1, 1,1,1,1,1,-1,-1,1,1,-1,-1,-1,-1,-1,-1,1,1,-1, -1,-1,1,-1, 1,-1,1,-1,-1,1,1,1,-1,-1,1,1,1,1,1,-1,-1,1,1,-1,-1,-1,-1,-1,1, 1,-1,-1,-1,-1,1,-1,1,-1,1,-1,1,1,1, -1,1,-1,1,1,1,-1,1,1,1,-1,- 1,1,1,1,-1,-1,-1,1,1,1,-1,1,-1,-1,-1,-1,1,-1,1,1,1,1,1,-1,1,1,- 1,1,1,-1,-1,-1,-1,-1,1,1,-1,-1,1,1,1,1,-1,1,-1,-1,-1,-1,1,1,-1,- 1,1,1,-1,-1,-1,-1,-1,1,1,-1,-1,1,1,1,-1,-1,-1,-1,1,1,-1,-1,-1,- 1,-1,-1,1,1,1,-1,-1,-1,-1,-1,1,1,-1,-1,-1,-1,-1,-1,1,1,-1,-1,- 1,1,1,-1,-1,-1,-1,-1,-1,1,1,-1,-1,-1,1,1,-1,-1,-1,-1,-1,-1,1,1,-1, 1,-1,1,1,1,1,1,-1,1,1,1,1,1,-1,1,1,1,1,-1,-1,1,1,1,1,}.

Figure 18:
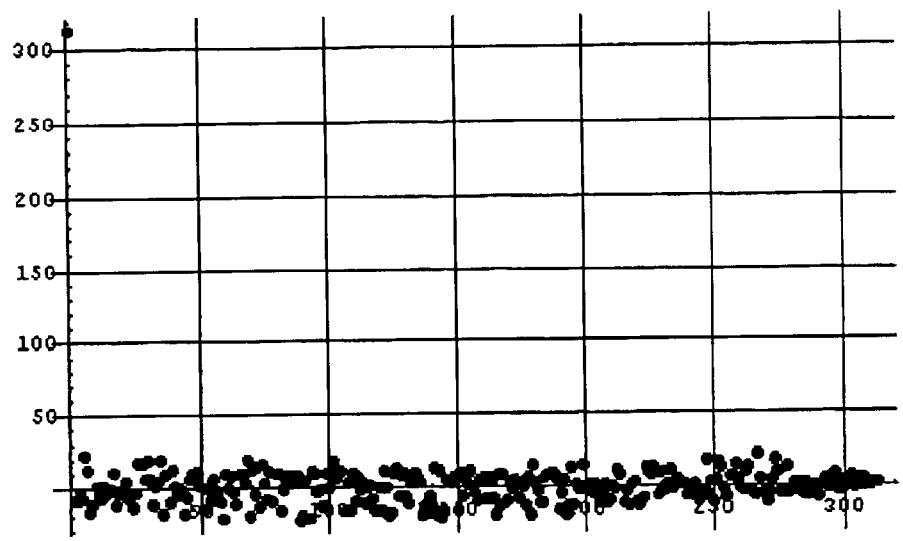
FIG. 18 shows the autocorrelation of the function of a c313 code of the present invention according to a one embodiment.

The autocorrelation function of the c313 code given above is shown in FIG. 18. The maximum magnitude of the autocorrelation sidelobes of this code is 21 compared to its peak of 313.

Figure 19:
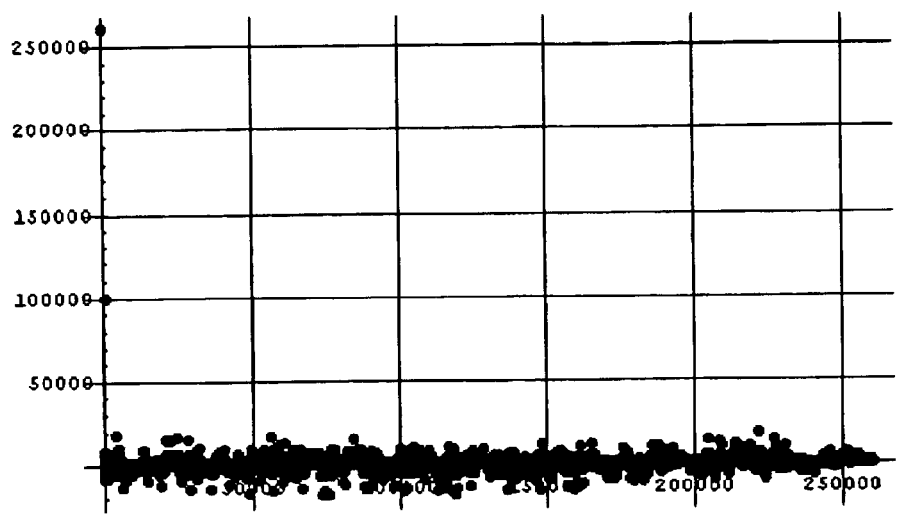
FIG. 19 shows the autocorrelation function a of product code for the c313 code of FIG. 18.
Figure 20:
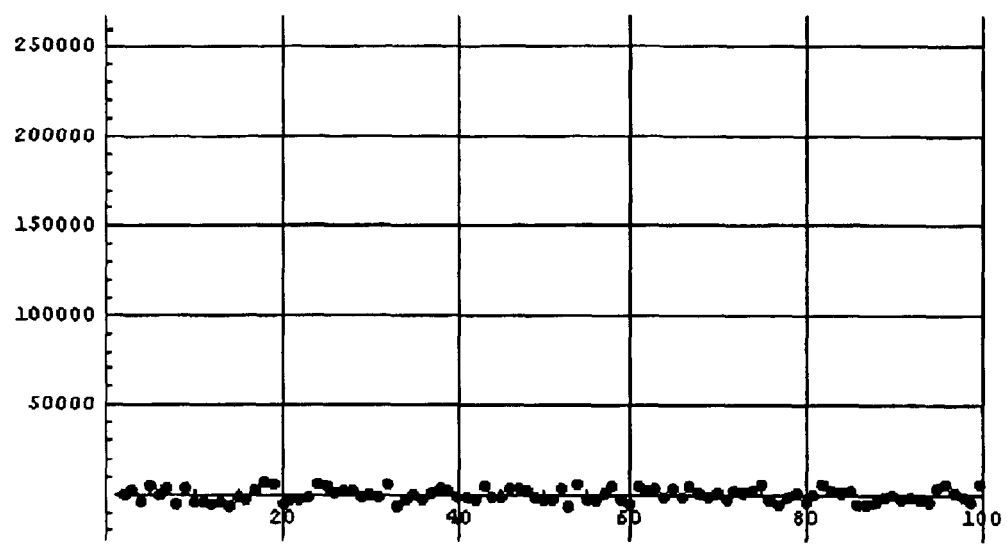
FIG. 20 shows detail of the sidelobes of FIG. 19 for the first 100 symbols.

The product code p313 is then given by $$p313[t]=c832[t]c313[t] \qquad (19)$$

where c832 is the pseudonoise code in each segment. The product code p313 has a symbol rate of 10.762237 Msps and period 832×313=260,416 chips. The code c832 has a period of 832 chips and a 10.762237 Msps symbol rate. The c313 code has a period 313 chips and symbol rate 10.76+/832= 12.9+ ksps. The product code has no data modulation over this entire half field period and thus provides a very high processing gain against interference and noise of 260,416 or 54.2 dB. Since the signal is 100% synchronization it can operate with only 1/313 of the power required for the ordinary ATSC DTV signal. The product code p313 has the autocorrelation function shown in FIG. 19. Although the autocorrelation sidelobe has a maximum of 99871 relative to the peak of 260416, the second peak is offset by 511 chips, the period of the 511 chip code, and so is sufficiently offset in time to be of no consequence. A more detailed look at the sidelobes is given in FIG. 20 for the first 100 symbols. This signal can have several variations. For example, the 313-chip code could be a somewhat different but similar code. The data could be 8-ary or 4-ary modulated to carry a higher data rate.

Note that there are a number of maximal length 511 chip codes. An alternative with better sidelobe protection would begin with the same ATSC 511-chip code, but follow that code with other different 511 chip codes. That type of approach however has a longer acquisition time.

In some embodiments, one or both of the half-fields of the positioning signal is biphase modulated by a 41+ bps binary data steam. Each data bit has its sign transition synchronized with the beginning of a half field. In some embodiments, the binary data stream represents a time signal, for example representing time of day, date, year, and the like. In some embodiments, the binary data stream identifies the transmitter of the positioning signal.

Figure 21:
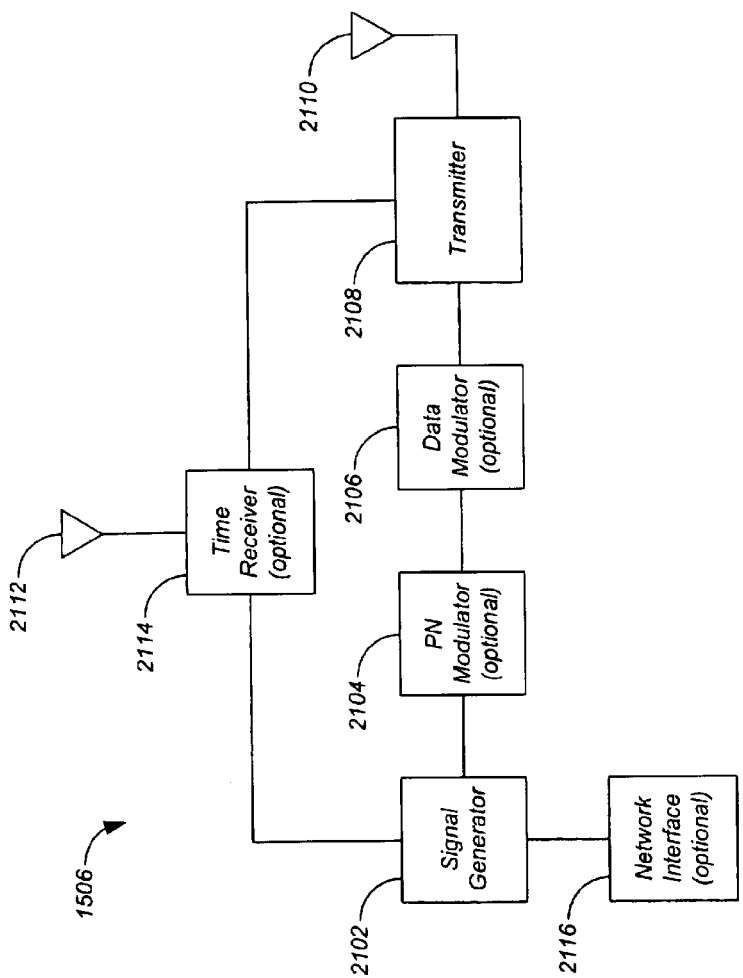
FIG. 21 shows a PTV transmitter according to a preferred embodiment.

FIG. 21 shows a PTV transmitter 1506 according to a preferred embodiment. PTV transmitter 1506 comprises a signal generator 2102, an optional PN modulator 2104, an optional data modulator 2106, a transmitter 2108, an antenna 2110, an optional time receiver 2114 and antenna 2112, and an optional network interface 2116 for communicating over link 1520.

Figure 22:
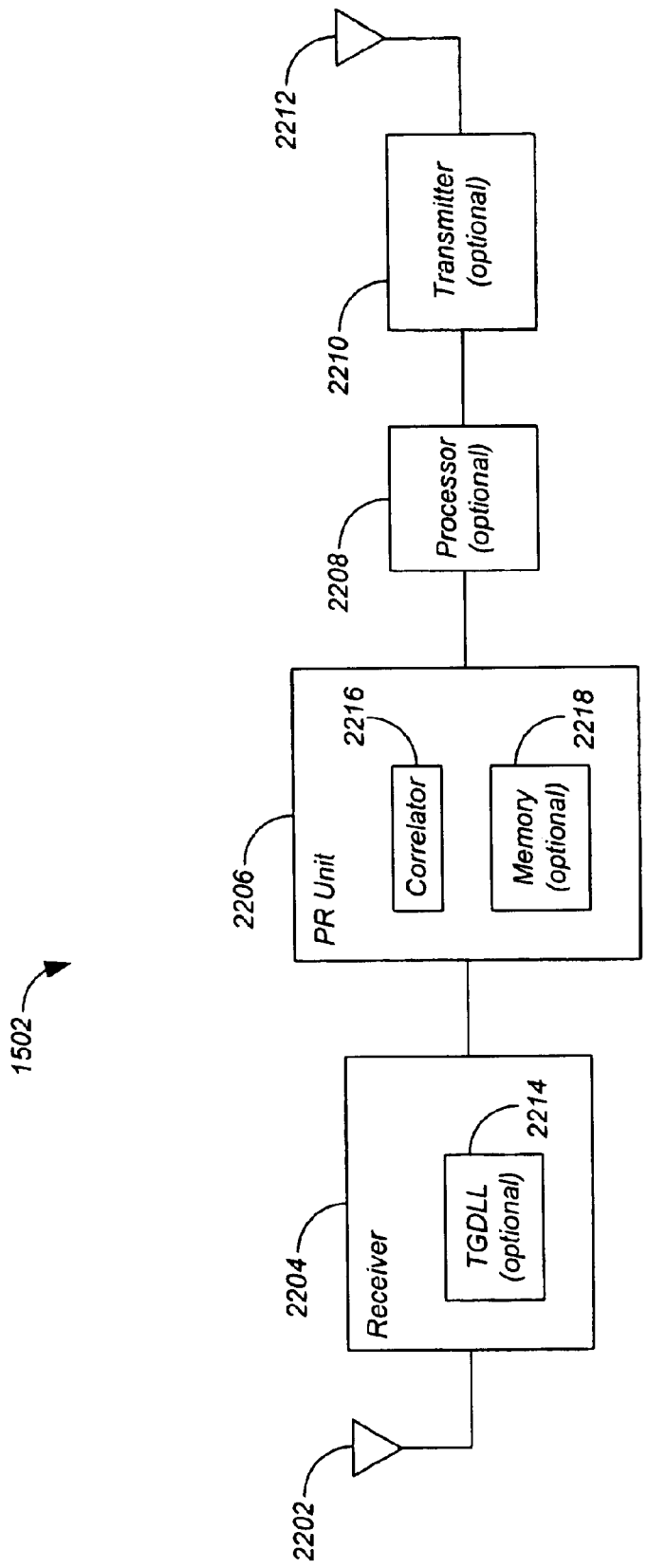
FIG. 22 shows a user terminal according to a preferred embodiment.

FIG. 22 shows a user terminal 1502 according to a preferred embodiment. User terminal 1502 comprises an antenna 2202, a receiver 2204, a pseudorange (PR) unit 2206, a processor 2208, and an optional transmitter 2210 and antenna 2212. Receiver 2204 optionally comprises a time-gated delay-lock loop (TGDLL) 2214 for tracking the positioning signals received from PTV transmitters 1506 as described above for DTV signals. PR unit 2206 optionally comprises a correlator 2216 and a memory 2218.

Figure 23:
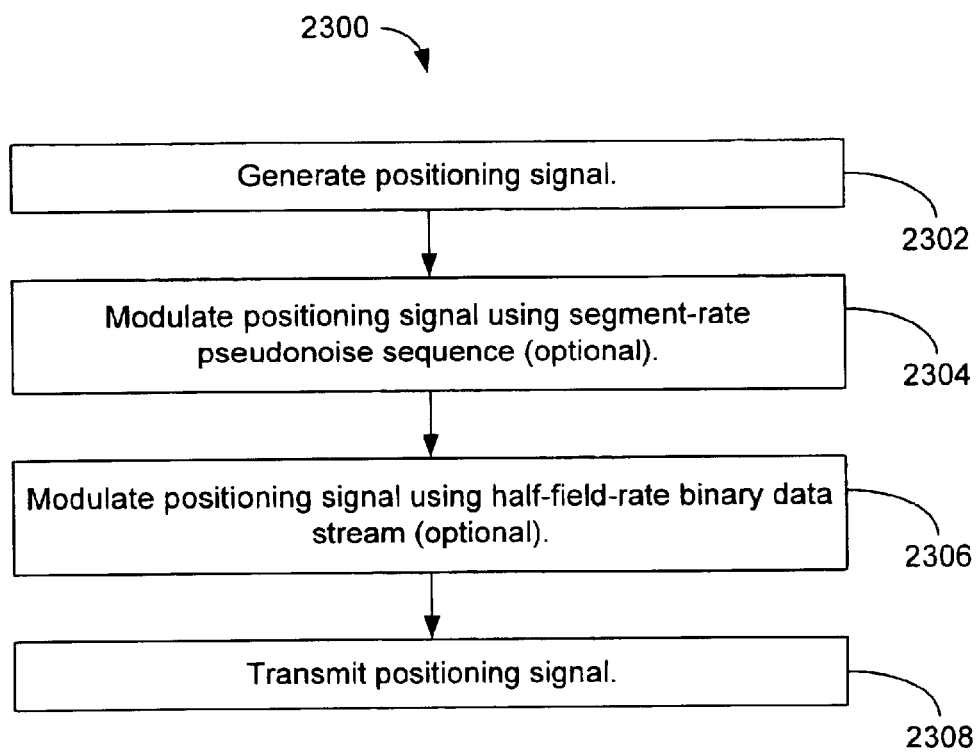
FIG. 23 shows a process performed by the PTV transmitter of FIG. 21 according to a preferred embodiment.

FIG. 23 shows a process 2300 performed by a PTV transmitter 1506 according to a preferred embodiment. Signal generator 2102 generates the positioning signal described above (step 2302).

PN modulator 2104 optionally modulates one or both of the half-fields of the positioning signal using a pseudonoise sequence having a chip rate corresponding to the segment rate (step 2304). As described above, the pseudonoise sequence can comprise a portion of a rotated version of the 511-chip field synchronization signal, a Global Positioning System L5 code, or some other such signal. In addition, each PTV transmitter 1506 can use a different code to facilitate multiple access to the same frequency band. Alternatively, each PTV transmitter 1506 can transmit its positioning signal at a different frequency.

Data modulator 2106 optionally modulates one or both of the half-fields of the positioning signal using a binary data stream having a bit rate corresponding to the half-field rate (step 2306), as described above. Transmitter 2108 transmits the positioning signal (step 2308). In some embodiments, optional time receiver 2114 receives an accurate time signal such as a GPS time signal, and the positioning signal is transmitted according to the accurate time signal, for example by setting the transmitter clock according to the time signal.

Figure 24:
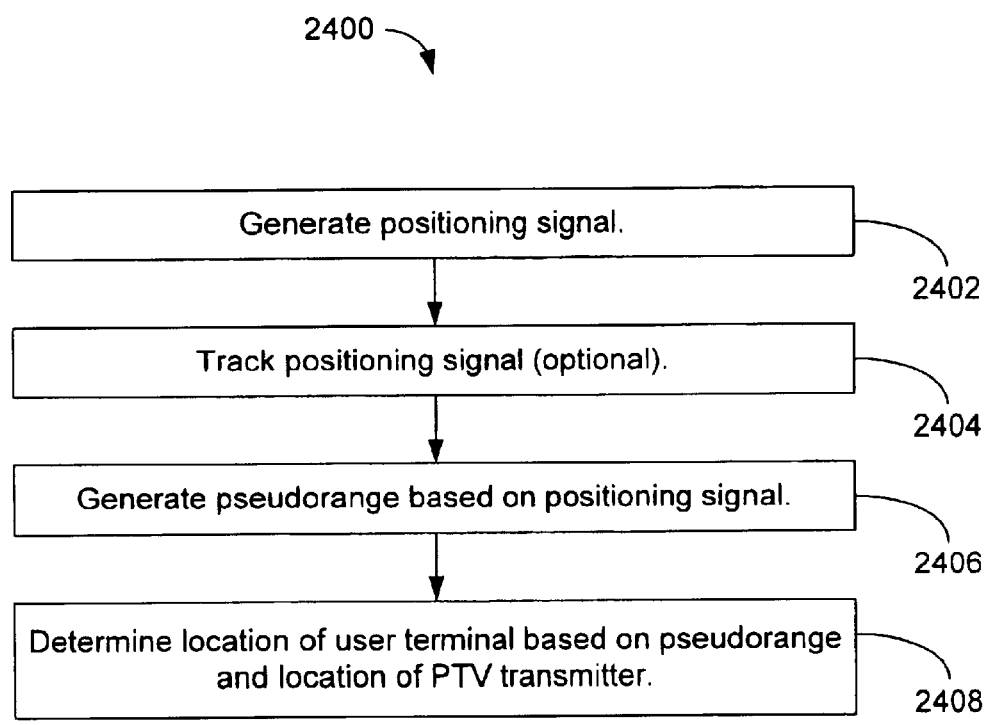
FIG. 24 shows a process performed by the user terminal of FIG. 22 according to a preferred embodiment.

FIG. 24 shows a process 2400 performed by a user terminal 1502 according to a preferred embodiment. Receiver 2204 receives the positioning signal transmitted by a PTV transmitter 1506 (step 2402). TGDLL 2214 optionally tracks the received positioning signal (step 2404).

PR unit 2206 generates a pseudorange based on the received positioning signal according to the techniques described above (step 2406). In some embodiments, correlator 2216 correlates the received positioning signal with a signal generated by user terminal 1502 as the positioning signal is received. In other embodiments, PR unit 2206 stores a portion of the received positioning signal in memory 2218, and correlator 2216 then correlates the stored portion of the positioning signal and the signal generated by user terminal 1502.

In some embodiments, receiver 2204 also receives other types of signals, such as digital television signals, global positioning signals, and mobile telephone signals. According to these embodiments, PR unit 2206 generates further pseudoranges based on these further signals.

In some embodiments, processor 2208 determines the location of user terminal 1502 based on the pseudorange and a location of PTV transmitter 1506 (step 2408) as described above. In such embodiments, user terminal 1502 can display the location to the user and/or transmit the location to location server 1510, which can transmit the location to rescue teams, or to other portable units such as other user terminals 1502, for example to enable members of a family to locate each other.

In other embodiments, transmitter 2210 transmits the pseudoranges to location server 1510, which determines the location of user terminal 1502. In embodiments using other signals such as GPS signals, processor 2208 or location server 1510 determine the position of user terminal 1502 based on the pseudoranges obtained from each signal and the location of the transmitter of each signal. In some embodiments, processor 2208 considers differences between the transmitter clocks and a known time reference when determining the location of user terminal 1502.

In some embodiments, processor 2208 determines a general geographic area within which the user terminal is located, and determines the position of the user terminal based on the pseudo-range and the general geographic area, as described above for DTV signals. In some embodiments, processor 2208 determines a terrain elevation in a vicinity of the user terminal, and determines the position of the user terminal based on the pseudo-range and the terrain elevation, also as described above for DTV signals.

In embodiments where the positioning signal is modulated by a pseudonoise sequence at the segment rate that identifies the transmitter of the positioning signal, correlator 2216 or some other circuit recovers that pseudonoise sequence and identifies the transmitter based on that further pseudonoise sequence. In embodiments where the positioning signal comprises a binary data stream having a bit rate corresponding to the half-field rate, user terminal 1502 recovers the binary data stream. In embodiments where the binary data stream identifies the transmitter of the positioning signal, user terminal 1502 identifies the transmitter based on the binary data stream for use in position determination.

Figure 25:
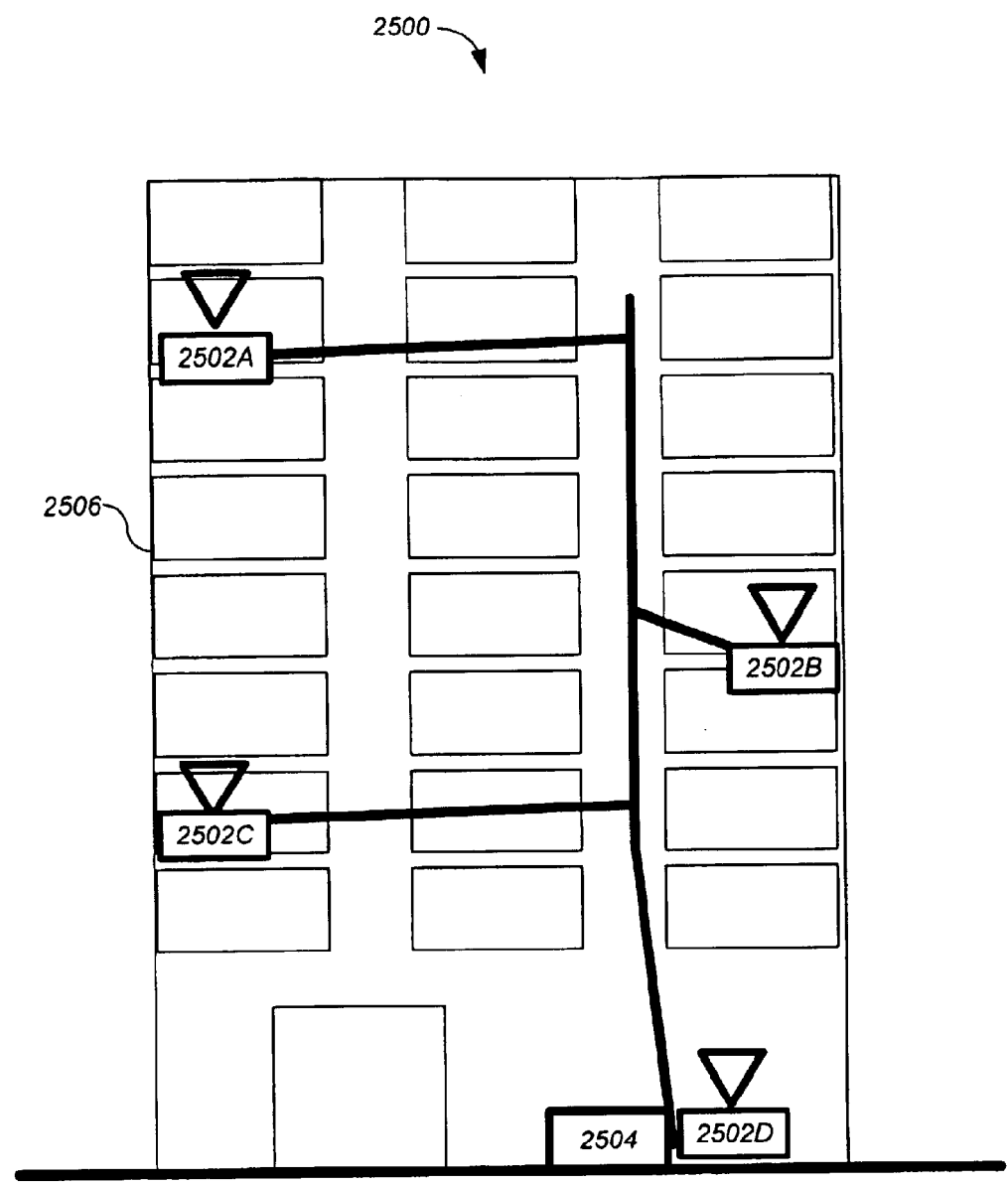
FIG. 25 shows such a distributed PTV system according to a preferred embodiment.

Some embodiments feature a distributed PTV system comprising a plurality of PTV transmitters linked to a central PTV controller. FIG. 25 shows such a distributed PTV system 2500 according to a preferred embodiment. PTV system 2500 comprises a plurality of PTV transmitters 2502A, B, C, D linked to a central PTV controller 2504 in a building 2506. Preferably PTV transmitters 2502 are located on different floors of building 2506 to enhance three-dimensional position determination.

PTV controller 2504 preferably comprises a clock such as a rubidium clock locked to GPS time to control the timing and frequency of the positioning signals transmitted by PTV transmitters 2502. PTV controller 2504 generates the positioning signals at some convenient IF frequency that can be easily distributed throughout the building via coaxial cable or other means.

PTV controller 2504 can include a data entry device that allows a user to send digital messages, such as a panic button signal or other information to the emergency personnel located in the building. The data entry device can also allow a user to input the building number and the location of the PTV controller. For example, the building number could be a number pair where the first number indicates the city or general region of the building and the second number identifies the building. These numbers can mimic the zip code. A third number can indicate specific PTV transmitters within the building.

PTV controller 2504 also generates clocks and power that can be fed to PTV transmitters over a cable such as a coaxial cable. The clock of PTV controller 2504 is preferably on continuously. However, the other elements can be turned on only when emergency personnel turn a key switch if that is desired.

PTV transmitters 2502 receive the signals from PTV controller 2504 over the cable, translate the signals to the appropriate TV channel frequency or to an ISM band frequency, and broadcast the signal. Preferably the signal is only broadcast during an emergency mode.

Alternatively, the PTV controller 2504 can transmit RF positioning signals at the appropriate frequency and simply feed these signals over the coaxial cable to PTV transmitters 2502.

In either mode of operation, user terminal 1502 can identify each PTV transmitter 2502 using the frequency channel of the positioning signal, a binary data stream in the positioning signal, the building number, or any combination thereof. The translation of this information to exact position can then be obtained either by means of data stored in user terminal 1502 or by means of the binary data stream.

User terminal 1502 can include a emergency phone, and can broadcast this information to the emergency team captain or supervisor so that the captain can see on a laptop computer screen the location in three dimensions of team personnel.

ALTERNATE EMBODIMENTS

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

For example, while various signals and signal processing techniques are discussed herein in analog form, digital implementations will be apparent to one skilled in the relevant art after reading this description.

For example, although one method for tracking the ATSC signal using the in-phase and quadrature channels is described, it should be clear that one can use only the in-phase channel, only the quadrature channel or any combination of the two to provide accurate tracking. Furthermore it should be clear that there are several methods of tracking these signals using various forms of conventional delay lock loops and through the use of various types of matched filters.

Implementations of the present invention exploit the low duty factor of the DTV signal in many ways. For example, one implementation employs a time-gated delay-lock loop (DLL) such as that disclosed in J. J. Spilker, Jr., Digital Communications by Satellite, Prentice-Hall, Englewood Cliffs N.J., 1977, Chapter 18-6 to track the DTV signal. Other implementations employ variations of the DLL, including coherent, noncoherent, and quasi-coherent DLLs, such as those disclosed in J. J. Spilker, Jr., Digital Communications by Satellite, Prentice-Hall, Englewood Cliffs N.J., 1977, Chapter 18 and B. Parkinson and J. Spilker, Jr., Global Positioning System-Theory and Applications, AIAA, Washington, D.C., 1996, Vol. 1, Chapter 17, Fundamentals of Signal Tracking Theory by J. Spilker, Jr. Other implementations employ various types of matched filters, such as a recirculating matched filter.

In some implementations, DTV location server 110 employs redundant signals available at the system level, such as pseudoranges available from the DTV transmitters, making additional checks to validate each DTV channel and pseudo-range, and to identify DTV channels that are erroneous. One such technique is conventional receiver autonomous integrity monitoring (RAIM).

Accordingly, other embodiments are within the scope of the following claims.

What is claimed is:

1. An apparatus comprising:

a signal generator adapted to generate a positioning signal comprising a first half-field and a second half-field;

wherein each of the first and second half-fields comprises 313 segments; and wherein each of the segments comprises 832 chips comprising an American Television Standards Committee (ATSC) digital television (DTV) segment synchronization signal and a pseudonoise sequence; and a transmitter adapted to transmit the positioning signal.

2. The apparatus of claim 1, wherein the pseudonoise sequence comprises a portion of at least one of the group consisting of:

a rotated version of the ATSC DTV field synchronization signal; and a Global Positioning System L5 code.

3. The apparatus of claim 1, wherein a user terminal receives the positioning signal and determines the location of the user terminal based on the positioning signal.

4. The apparatus of claim 1, wherein the segments are generated at a segment rate, further comprising:

a modulator adapted to modulate at least one of the group consisting of the first half-fields and the second half-fields of the positioning signal using a further pseudonoise sequence having a chip rate corresponding to the segment rate.

5. The apparatus of claim 1, wherein the further pseudonoise sequence comprises a portion of at least one of the group consisting of:

a rotated version of the ATSC DTV field synchronization signal; and a Global Positioning System L5 code.

6. The apparatus of claim 1, wherein the half-fields are generated at a half-field rate, further comprising:

a modulator adapted to modulate at least one of the group consisting of the first half-fields and the second half-fields of the positioning signal using a binary data stream having a bit rate corresponding to the half-field rate.

7. An apparatus comprising:

signal generator means for generating a positioning signal comprising a first half-field and a second half-field;

wherein each of the first and second half-fields comprises 313 segments; and wherein each of the segments comprises 832 chips comprising an American Television Standards Committee (ATSC) digital television (DTV) segment synchronization signal and a pseudonoise sequence; and transmitter means for transmitting the positioning signal.

8. The apparatus of claim 7, wherein the pseudonoise sequence comprises a portion of at least one of the group consisting of:
   a rotated version of the ATSC DTV field synchronization signal; and
   a Global Positioning System L5 code.

9. The apparatus of claim 7, wherein a user terminal receives the positioning signal and determines the location of the user terminal based on the positioning signal.

10. The apparatus of claim 7, wherein the segments are generated at a segment rate, further comprising:
   modulator means for modulating at least one of the group consisting of the first half-fields and the second half-fields of the positioning signal using a further pseudonoise sequence having a chip rate corresponding to the segment rate.

11. The apparatus of claim 7, wherein the further pseudonoise sequence comprises a portion of at least one of the group consisting of:
   a rotated version of the ATSC DTV field synchronization signal; and
   a Global Positioning System L5 code.

12. The apparatus of claim 7, wherein the half-fields are generated at a half-field rate, further comprising:
   modulator means for modulating at least one of the group consisting of the first half-fields and the second half-fields of the positioning signal using a binary data stream having a bit rate corresponding to the half-field rate.

13. A method comprising:
   generating a positioning signal comprising a first half-field and a second half-field; and
   transmitting the positioning signal;
   wherein each of the first and second half-fields comprises 313 segments; and
   wherein each of the segments comprises 832 chips comprising an American Television Standards Committee (ATSC) digital television (DTV) segment synchronization signal and a pseudonoise sequence.

14. The method of claim 13, wherein the pseudonoise sequence comprises a portion of at least one of the group consisting of:
   a rotated version of the ATSC DTV field synchronization signal; and
   a Global Positioning System L5 code.

15. The method of claim 13, wherein a user terminal receives the positioning signal and determines the location of the user terminal based on the positioning signal.

16. The method of claim 13, wherein the segments are generated at a segment rate, further comprising:
   modulating at least one of the group consisting of the first half-fields and the second half-fields of the positioning signal using a further pseudonoise sequence having a chip rate corresponding to the segment rate.

17. The method of claim 13, wherein the further pseudonoise sequence comprises a portion of at least one of the group consisting of:
   a rotated version of the 511-chip field synchronization signal; and
   a Global Positioning System L5 code.

18. The method of claim 13, wherein the half-fields are generated at a half-field rate, further comprising:
   modulating at least one of the group consisting of the first half-fields and the second half-fields of the positioning signal using a binary data stream having a bit rate corresponding to the half-field rate.

19. Computer-readable media embodying instructions executable by a computer to perform a method comprising:
   generating a positioning signal comprising a first half-field and a second half-field; and
   transmitting the positioning signal;
   wherein each of the first and second half-fields comprises 313 segments; and
   wherein each of the segments comprises 832 chips comprising an American Television Standards Committee (ATSC) digital television (DTV) segment synchronization signal and a pseudonoise sequence.

20. The media of claim 19, wherein the pseudonoise sequence comprises a portion of at least one of the group consisting of:
   a rotated version of the ATSC DTV field synchronization signal; and
   a Global Positioning System L5 code.

21. The media of claim 19, wherein a user terminal receives the positioning signal and determines the location of the user terminal based on the positioning signal.

22. The media of claim 19, wherein the segments are generated at a segment rate, wherein the method further comprises:
   modulating at least one of the group consisting of the first half-fields and the second half-fields of the positioning signal using a further pseudonoise sequence having a chip rate corresponding to the segment rate.

23. The media of claim 19, wherein the further pseudonoise sequence comprises a portion of at least one of the group consisting of:
   a rotated version of the 511-chip field synchronization signal; and
   a Global Positioning System L5 code.

24. The media of claim 19, wherein the half-fields are generated at a half-field rate, wherein the method further comprises:
   modulating at least one of the group consisting of the first half-fields and the second half-fields of the positioning signal using a binary data stream having a bit rate corresponding to the half-field rate.

* * * * *